(12) United States Patent
Marais et al.

(10) Patent No.: US 10,975,318 B2
(45) Date of Patent: Apr. 13, 2021

(54) USE OF RARE EARTH COMPLEXES AS MARKERS OF PETROLEUM PRODUCTS, CRUDE OILS, BIOFUELS OR LUBRICANTS

(71) Applicants: INOVENTEAM, Affringues (FR); UNIVERSITE CLAUDE BERNARD LYON 1, Villeurbanne (FR); CENTRE NATIONAL DE LA RECHERCHE SCIENTIFIQUE (CNRS), Paris (FR)

(72) Inventors: Arthur Marais, Lochrist (FR); Mahmoud Ould-Metidji, Marseilles (FR); Florian Lepoivre, Laval (FR); Anatole Collet, Montelimar (FR); Matteo Martini, Villars les Dombes (FR); Fabien Rossetti, Villeurbanne (FR); Olivier Tillement, Fontaines Saint-Martin (FR); Antoine Vanlaer, Paris (FR); François Ghillebaert, Affringues (FR)

(73) Assignees: INOVENTEAM, Affringues (FR); UNIVERSITE CLAUDE BERNARD LYON 1, Villeurbanne (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 16/068,258

(22) PCT Filed: Jan. 12, 2017

(86) PCT No.: PCT/FR2017/050062
§ 371 (c)(1),
(2) Date: Jul. 5, 2018

(87) PCT Pub. No.: WO2017/121958
PCT Pub. Date: Jul. 20, 2017

(65) Prior Publication Data
US 2019/0010413 A1   Jan. 10, 2019

(30) Foreign Application Priority Data

Jan. 12, 2016 (FR) .................................... 16 50208

(51) Int. Cl.
*C10L 1/00* (2006.01)
*C10M 171/00* (2006.01)
(Continued)

(52) U.S. Cl.
CPC ............. *C10L 1/003* (2013.01); *C10L 1/301* (2013.01); *C10M 171/007* (2013.01);
(Continued)

(58) Field of Classification Search
None
See application file for complete search history.

(56) References Cited

U.S. PATENT DOCUMENTS

| 3,794,473 A | 2/1974 | Eisentraut et al. |
| 4,374,120 A | 2/1983 | Soini et al. |

(Continued)

FOREIGN PATENT DOCUMENTS

| EP | 1 380 632 A1 | 1/2004 |
| WO | 96/10620 A1 | 4/1996 |

(Continued)

OTHER PUBLICATIONS

Machine Translation of WO 2014/091144, EPO (Year: 2014).*
(Continued)

*Primary Examiner* — Derek N Mueller
(74) *Attorney, Agent, or Firm* — Oliff PLC

(57) ABSTRACT

The use, as markers of petroleum products, crude oils, biofuels or lubricants, of rare earth complexes or one of the constituents thereof chosen from rare earth ligands or salts, being capable of forming a rare earth complex after the addition of a developing solution. Preferably, the rare earth (Continued)

complex can be detected by time-resolved fluorescence. Also, a marking method and a method for detecting a rare earth complex as a marker of petroleum products, crude oils, biofuels or lubricants.

13 Claims, 17 Drawing Sheets

(51) Int. Cl.
    *C10L 1/30*     (2006.01)
    *G01N 21/64*     (2006.01)
    *C10N 10/06*     (2006.01)
    *C10N 40/00*     (2006.01)

(52) U.S. Cl.
    CPC ...... *G01N 21/6408* (2013.01); *C10L 2230/16* (2013.01); *C10M 2227/09* (2013.01); *C10N 2010/06* (2013.01); *C10N 2040/42* (2020.05)

(56) References Cited

U.S. PATENT DOCUMENTS

| | | |
|---|---|---|
| 5,525,516 A | 6/1996 | Krutak et al. |
| 5,998,211 A | 12/1999 | Albert et al. |

FOREIGN PATENT DOCUMENTS

| | | |
|---|---|---|
| WO | 96/22345 A1 | 7/1996 |
| WO | 2004/068113 A2 | 8/2004 |
| WO | 2014/91144 A2 | 6/2014 |
| WO | 2015/104509 A1 | 7/2015 |

OTHER PUBLICATIONS

Dickson et al., "Ultrasensitive bioanalytical assays using time-resolved fluorescence detection," Pharmacology Therapeutics, 1995, vol. 66, pp. 207-235.

Apr. 3, 2017 International Search Report issued in International Patent Application No. PCT/FR2017/050062.

\* cited by examiner

US 10,975,318 B2

USE OF RARE EARTH COMPLEXES AS MARKERS OF PETROLEUM PRODUCTS, CRUDE OILS, BIOFUELS OR LUBRICANTS

TECHNICAL FIELD

The present invention relates to the marking of petroleum products, crude oils, biofuels or lubricants.

More precisely, this invention relates to the use of rare earth complexes as markers of petroleum products, crude oils, biofuels or lubricants. The invention also relates to a method for detecting these markers by time-resolved fluorescence.

BACKGROUND OF THE INVENTION

Petroleum products are commonly marked with substances in order to allow subsequent identification of these products.

In particular, in order to prevent fraud, government agencies and regulatory authorities mark petroleum products at the time of payment of the excise duty. Manufacturers may also want to mark their petroleum products in order to make them traceable.

The markers most commonly used are dyes. The color of the petroleum product is then modified specifically by adding the marker, and this modification is visible to the naked eye. For example, Solvent Yellow 124, a yellow dye, is used for marking certain gas oils and kerosene.

Other markers not detectable by the naked eye may also be used. In this case, the markers are detectable by techniques of chemical analysis such as inductively coupled plasma spectrometry (ICP) and high-performance liquid chromatography (HPLC). However, the use of these analysis techniques generally requires tedious preparations and/or experimental techniques, incompatible with quick detection of the markers used.

Fluorescence is an attractive analytical technique as it can be carried out easily and does not require tedious experimental techniques. This technique has already been used for detecting markers of petroleum products. However, petroleum products often have considerable fluorescence intrinsically, so it becomes difficult to differentiate the fluorescence of the marker from the fluorescence naturally emitted by the petroleum products. This requires high concentrations of markers or compounds capable of emitting a signal at wavelengths, notably infrared, that differ from those of the fluorescent compounds naturally present in petroleum products.

Document WO96/22345 describes markers of petroleum products that are derived from 2(3H)-furanone and are detected by fluorescence after adding a reagent. These markers can be detected at a concentration of 10 ppm.

Document WO2004/068113 describes the use of organic molecules at a concentration of 1 ppm as agents for marking petroleum products. These markers are detected by ion mobility spectrometry.

Document WO96/10620 describes markers of petroleum products based on squaraine, phthalocyanine or naphthalocyanine that may be used at a sub-ppm concentration. They are detected by near infrared fluorescence.

As far as the inventors know, the concentration of the markers effectively used in petroleum products is still high for effective marking, and is often above the ppm.

One of the aims of the present invention is therefore to supply new markers, detectable at very low concentrations in crude oils, biofuels, lubricants or petroleum products, and notably gasoline, gas oil, fuel oil or kerosene.

Another aim of the invention is to supply new markers of petroleum products, crude oils, biofuels or lubricants that are stable over time, so that their use is optimal.

Another aim of the invention is to supply markers of petroleum products, crude oils, biofuels or lubricants that meet the following criteria:

Relative difference of the marking signal <5% after 3 months at room temperature;
Product soluble and stable from −40 to +60° C.;
Product nonvolatile;
Product chemically stable;
No retention on a silica or activated carbon column.

The present invention also aims to supply a method for marking petroleum products, crude oils, biofuels or lubricants and a method for detecting these markers that is simple and can be carried out easily.

SUMMARY OF THE INVENTION

These aims, among others, are achieved by the invention, which relates firstly to the use of rare earth complexes or a constituent thereof selected from ligands or rare earth salts able to form a rare earth complex after adding a developing solution, as markers of petroleum products, crude oils, biofuels or lubricants.

The invention also relates to a method for detecting these complexes in petroleum products, crude oils, biofuels or lubricants by time-resolved fluorescence.

The inventors discovered, unexpectedly, that rare earth complexes could be used as markers of petroleum products, crude oils, biofuels or lubricants. In particular, these complexes can be detected easily at concentrations below 1 ppm and even at 100 ppb, or even at 1 ppb. Advantageously, these complexes are detectable by time-resolved fluorescence, this technique allowing simple, quick detection of the marker in a sample of petroleum product, crude oil, biofuel or lubricant.

DETAILED DESCRIPTION OF THE INVENTION

Figure 1A:
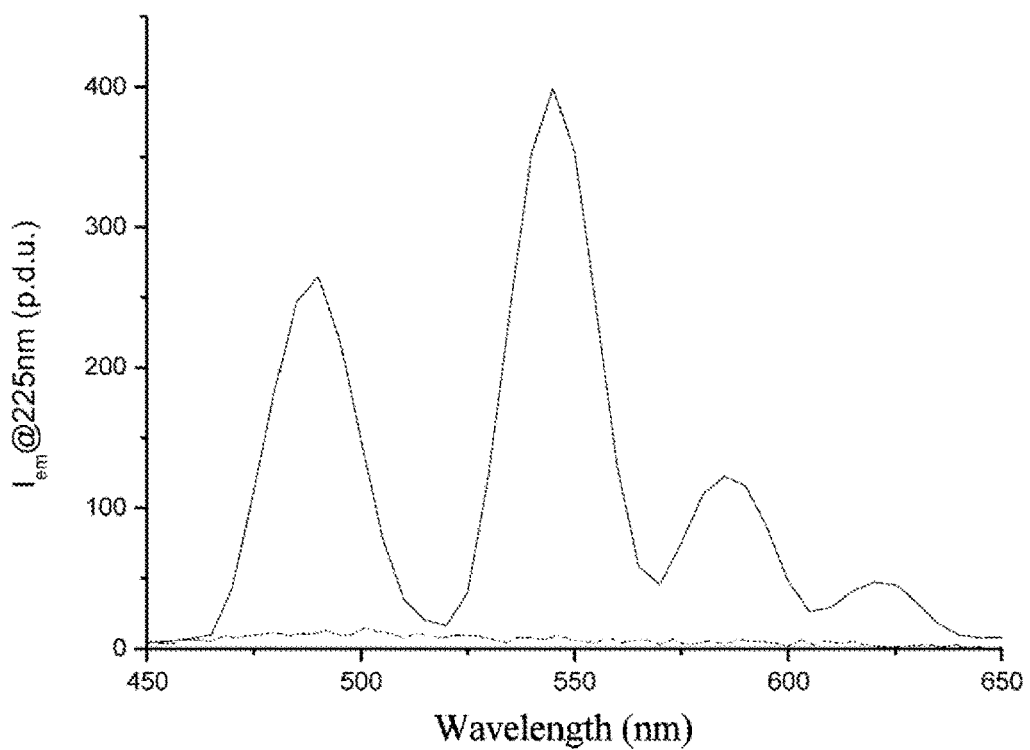
FIG. 1A shows, as a solid line, the time-resolved emission spectrum (delay 0.2 ms, acquisition time 1 ms, time for complete decrease 20 ms, accumulation of 0.2 s per point) under excitation at 225 nm of the marker DOTA(Tb) at 160 ppb in n-hexanol prepared according to example 5, and, as a broken line, the associated reference, corresponding to n-hexanol, analyzed in the same conditions.
Figure 1B:
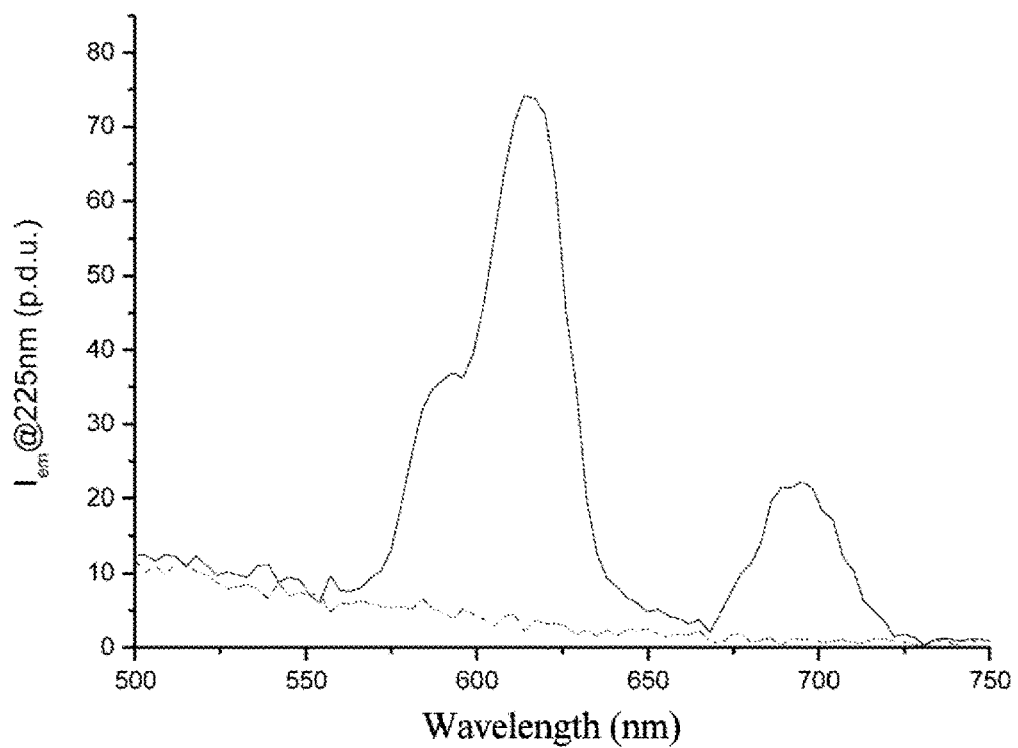
FIG. 1B shows, as a solid line, the time-resolved emission spectrum (delay 0.2 ms, acquisition time 1 ms, time for complete decrease 20 ms, accumulation of 0.5 s per point) under excitation at 225 nm of the marker DOTA(Eu) at 50 ppb in n-hexanol prepared according to example 4, and, as a broken line, the associated reference, corresponding to n-hexanol, analyzed in the same conditions.
Figure 1C:
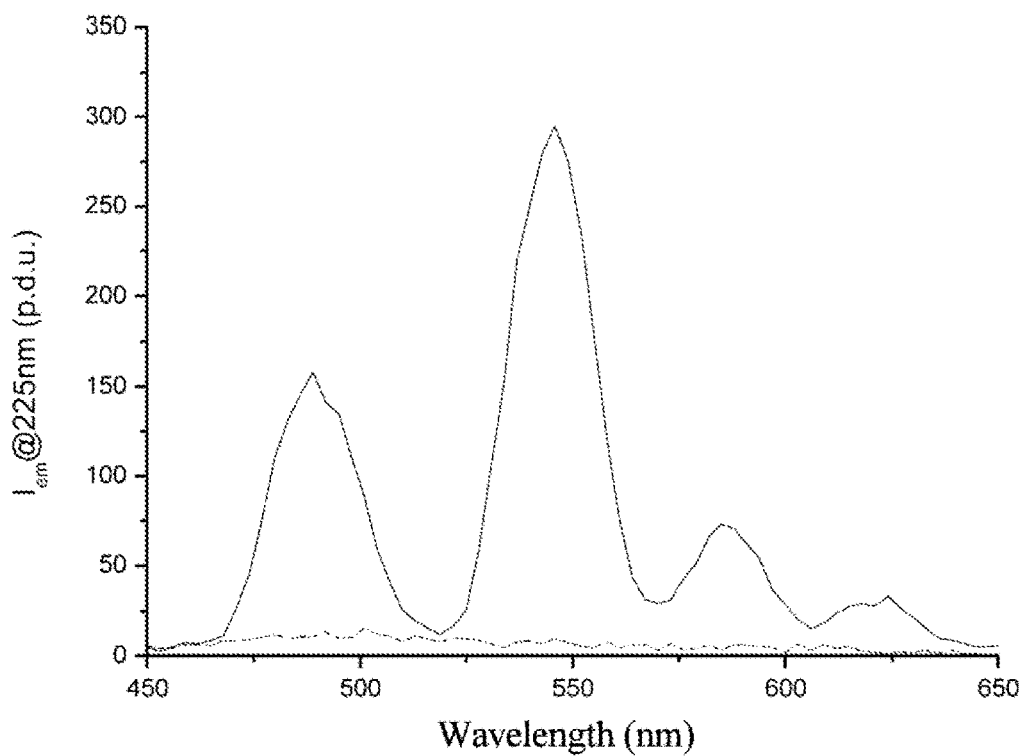
FIG. 1C shows, as a solid line, the time-resolved emission spectrum (delay 0.2 ms, acquisition time 1 ms, time for complete decrease 20 ms, accumulation of 0.2 s per point) under excitation at 225 nm of the marker PCTA(Tb) at 100 ppb in n-hexanol prepared according to example 2, and, as a broken line, the associated reference, corresponding to n-hexanol, analyzed in the same conditions.
Figure 1D:
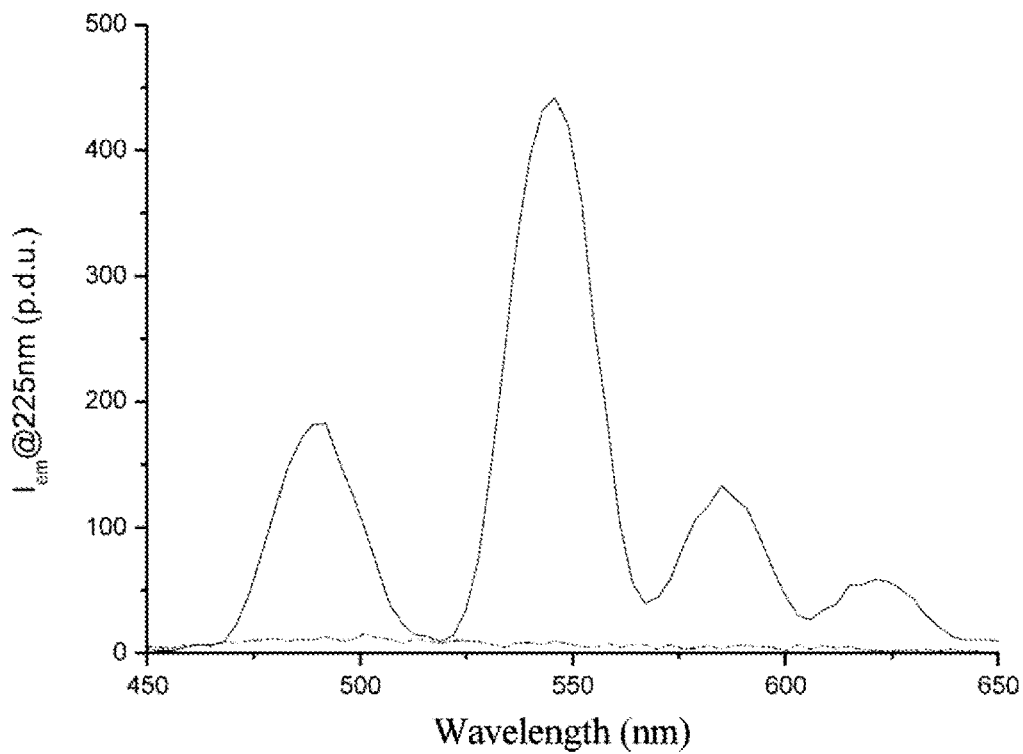
FIG. 1D shows, as a solid line, the time-resolved emission spectrum (delay 0.2 ms, acquisition time 1 ms, time for complete decrease 20 ms, accumulation of 0.2 s per point) under excitation at 225 nm of the marker TMPAC(Tb) at 100 ppb in n-hexanol prepared according to example 8, and, as a broken line, the associated reference, corresponding to n-hexanol, analyzed in the same conditions.

The invention therefore relates to the use, as markers of petroleum products, crude oils, biofuels or lubricants, (i) of a rare earth complex or (ii) of a ligand, said ligand being capable of forming a rare earth complex, after adding a developing solution comprising a rare earth salt, or (iii) of a rare earth salt, said rare earth salt being capable of forming a rare earth complex, after adding a developing solution comprising a ligand.

"Marker" denotes a chemical substance introduced alone or in combination in a product, and having specific physicochemical properties making it possible to authenticate the origin or verify the integrity of the previously marked product, by a method of quantitative, semiquantitative or qualitative physical or chemical analysis. The marker must therefore be detectable in the marked product to ensure that it is traceable.

"Rare earth complex" denotes a polyatomic structure comprising at least the following constituents: (i) a metal cation of a rare earth and (ii) one or more ligands, said metal cation being attached to said ligands by noncovalent bonds to form the rare earth complex.

"Rare earths" denotes the set consisting of scandium, yttrium and the lanthanides. Preferably, the rare earth of the metal complex is a metal of the lanthanide series. The metals of the lanthanide series are the elements of atomic number from 57 (lanthanum) to 71 (lutetium). For example, the lanthanides will be selected from the group consisting of: Pr, Nd, Sm, Eu, Gd, Tb, Dy, Ho, Er, Tm and Yb.

"Ligand" means any molecule capable of forming a complex with a metal cation. One and the same metal cation can be complexed by one or more ligands. When the metal complex comprises several ligands, the latter may be identical or different.

Preferably, the ligand is selected so that the metal complex has a dissociation constant Kd below $1 \times 10^{-5}$ and preferably below $1 \times 10^{-10}$ corresponding to a pKd above 5 and preferably above 10.

In the sense of the invention, "dissociation constant" means the value of the equilibrium constant between the metal cation in the state complexed by the complexing agent, and the free metal cation and complexing agent, dissociated in the solvent (Kd). To be precise, pKd is the opposite of the logarithm to base 10 of the dissociation constant (−log(Kd)), defined as the equilibrium constant of the reaction that reflects the transition from the complexed state to the ionic state.

The ligand is preferably a multidentate ligand comprising at least 3, preferably at least 4, coordination sites. Preferably, the ligand is selected from the molecules of the polyamine and/or polycarboxylic acid type and derivatives thereof, among which we may mention the esters and the amides. It is preferably a cyclic molecule.

According to a preferred embodiment of the invention, the multidentate ligand comprises a heterocycle and at least 3, preferably 4, coordination sites of said multidentate ligand forming, with other atoms, said heterocycle.

In a more preferred embodiment, the ligand of the rare earth complex is selected from:
2,2',2'',2'''-(1,4,7,10-tetraazacyclododecane-1,4,7,10-tetrayl)tetraacetic acid (DOTA), of formula (I)

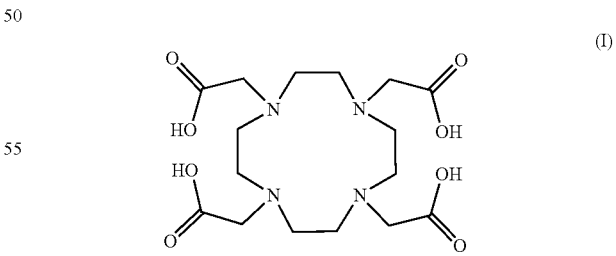

(I)

and derivatives thereof, among which we may mention DOTA-GA (2,2',2''-(10-(2,6-dioxotetrahydro-2H-pyran-3-yl)-1,4,7,10-tetraazacyclododecane-1,4,7-triyl)triacetic acid), DOTAEt (2,2',2'',2'''-(1,4,7,10-tetraazacyclododecane-1,4,7,10-tetrayl)tetraethyl tetraacetate), DOTAM (2,2',2'',2'''-(1,4,7,10-tetraazacyclododecane-1,4,7,10-tetrayl)tetraacetamide) and DO3A-pyridine of formula (II);

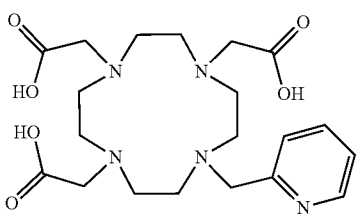

2,2',2''-[3,6,9,15-tetraazabicyclo[9.3.1]pentadeca-1(15), 11,13-triene-3,6,9-triyl]triacetic acid (PCTA), of formula (III)

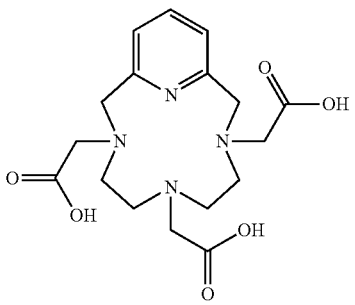

and derivatives thereof, among which we may mention the esters and the amides;

tetra-6-(methylene) picolinic acid cyclen (TMPAC) of formula (IV)

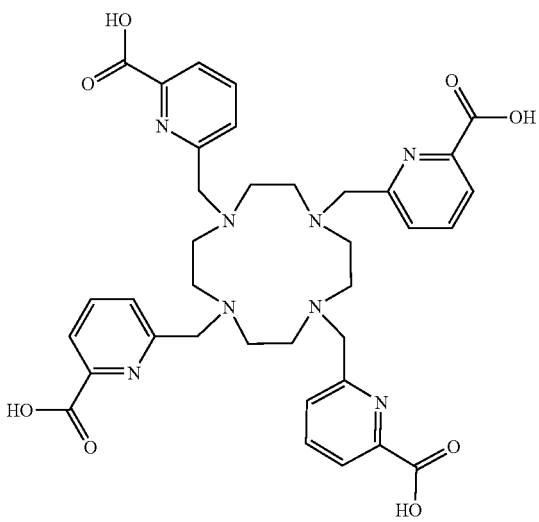

and derivatives thereof, among which we may mention the esters and the amides;

2,2',2''-(1,4,7-triazonane-1,4,7-triyl)triacetic acid (NOTA), of formula (V),

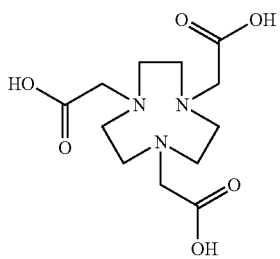

and derivatives thereof, among which we may mention the esters and the amides.

1,4,8,11-tetraazacyclotetradecane-1,4,8,11-tetraacetic acid (TETA or cyclam) and derivatives thereof, among which we may mention tetra-6-(methylene)picolinic acid cyclam (VI)

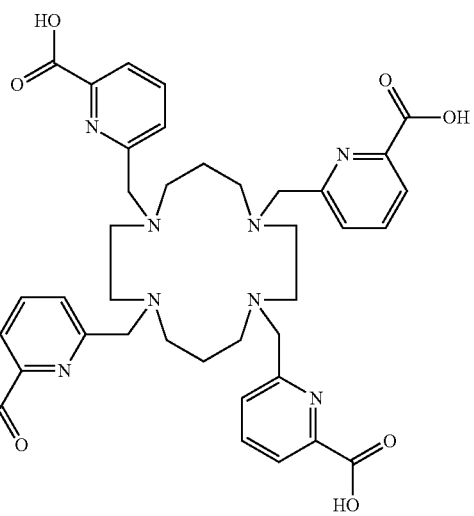

Among the other ligands usable according to the invention, we may mention dendrimers, ethylenediaminetetraacetic acid (EDTA), nitriloacetic acid (NTA), glutamic diacetic acid (GLDA), phosphonates, cyclodextrins and derivatives thereof, chitosan and bacterial or algal polysaccharides.

Advantageously, the rare earth complex is detectable by time-resolved fluorescence. The method of detection by time-resolved fluorescence, i.e. begun with a delay after excitation (i.e. some microseconds), is described for example in the article "Ultrasensitive Bioanalytical Assays Using Time-Resolved Fluorescence Detection", Pharmac. Ther. Vol. 66, pp. 207-235, 1995. This method makes it possible to eliminate a large part of the intrinsic luminescence from the marked petroleum product and only measure that relating to the marker.

According to one embodiment of the invention, the ligand comprises an aromatic ring comprising at least one nitrogen atom or sulfur atom or several conjugated aromatic rings that produce an antenna effect, i.e. they amplify the fluorescent signal emitted by the marker.

"Petroleum product" means the derivatives from crude oils resulting from the refining of the latter. In particular it means gasoline, gas oil, kerosene, fuel oil, LPG, bitumen, tar. Preferably, the petroleum product is gasoline, gas oil, fuel oil or kerosene.

"Crude oils" means mineral oils consisting of an unrefined mixture of hydrocarbons.

"Biofuel" means a fuel obtained from biomass. Biofuels may be used alone or mixed with a fuel of fossil origin. Among the biofuels we may mention biodiesel and bioethanol.

"Lubricant" means a product making it possible to reduce the friction of two elements in contact and moving relative to one another. It is most often oils, among which we may mention:
- mineral oils, which include all types of oils obtained by atmospheric or vacuum distillation of fossil fuels;
- vegetable oils, which include all types of oils obtained by trituration of seeds, nuts or fruits of plants, in particular the oleaginous plants. We may mention as examples flax oil, colza oil, sunflower oil, soybean oil, olive oil, palm oil, cabbage palm oil, castor oil, wood oil, maize oil, cucurbit oil, grapeseed oil, jojoba oil, sesame oil, walnut oil, hazelnut oil, almond oil, karite oil, groundnut oil, copra oil, tung oil, macadamia oil, cotton oil, alfalfa oil, rye oil, safflower oil, groundnut oil, copra oil, pine oil, cucurbit oil, rice oil, and argan oil. The derivatives of these oils are also regarded as lubricants, in particular their isomers and/or acids and/or amides and/or esters, more particularly their transesterification derivatives;
- animal oils such as oils from tallow and lard;
- synthetic oils such as polyalphaolefins.

The rare earth complexes may also be used in combination with other markers of petroleum products, crude oils, biofuels or lubricants, or with other rare earth complexes as defined above, or a constituent thereof selected from ligands or rare earth salts that are able to form a rare earth complex after adding a developing solution.

The invention also relates to the supply of a petroleum product, crude oil, biofuel or lubricant, characterized in that it comprises at least one rare earth complex as defined above as a marker, or a constituent thereof selected from ligands or rare earth salts that are able to form a rare earth complex after adding a developing solution.

Preferably, said rare earth complex, rare earth salt or ligand is contained in the petroleum product, crude oil, biofuel or lubricant, at a concentration less than or equal to 100 ppm, preferably less than or equal to 1 ppm, and even more preferably less than or equal to 100 ppb, for example between 1 ppb and 1 ppm, and notably between 10 ppb and 100 ppb.

According to one embodiment of the invention, said ligand able to form a rare earth complex, contained in the petroleum product, crude oil, biofuel or lubricant, is selected from DOTA, NOTA, DOTAM, PCTA, TMPAC and derivatives thereof.

The invention also relates to a crude oil, a biofuel, a lubricant or a petroleum product, notably gasoline, fuel oil, kerosene or gas oil, characterized in that it comprises a rare earth complex, for example a lanthanide complexed with a ligand, at a concentration less than or equal to 100 ppb, said rare earth complex being detectable by time-resolved fluorescence.

The invention also relates to a method for marking petroleum products, crude oils, biofuels or lubricants, characterized in that it consists essentially of adding, to a petroleum product, crude oil, biofuel or lubricant: (i) a rare earth complex or (ii) a ligand, said ligand being capable of forming a rare earth complex, after adding a developing solution comprising a rare earth salt, or (iii) a rare earth salt, said rare earth salt being capable of forming a rare earth complex, after adding a developing solution comprising a ligand.

The invention also relates to a method for detecting a rare earth complex as a marker of petroleum products, crude oils, biofuels or lubricants.

This method comprises time-resolved fluorescence detection of the rare earth complex as defined above, in a sample of petroleum product, crude oil, biofuel or lubricant.

Advantageously, the rare earth complex is detected by time-resolved fluorescence after extraction of the latter in an immiscible solution, preferably an aqueous solution. In this case the method comprises the following steps:
a) Mixing a sample of petroleum product, crude oil, biofuel or lubricant comprising as marker a rare earth complex detectable by time-resolved fluorescence, with an immiscible solution, preferably an aqueous solution;
b) Detecting the rare earth complex by time-resolved fluorescence of the immiscible solution.

The rare earth complex may also be detected using a solid support such as paper, strip, filter or solid flat support. In this case the method comprises the following steps:
a) Impregnating a solid support with the petroleum product, crude oil, biofuel or lubricant comprising a rare earth complex as a marker;
b) Detecting the rare earth complex by time-resolved fluorescence performed on the solid support.

Figure 5:
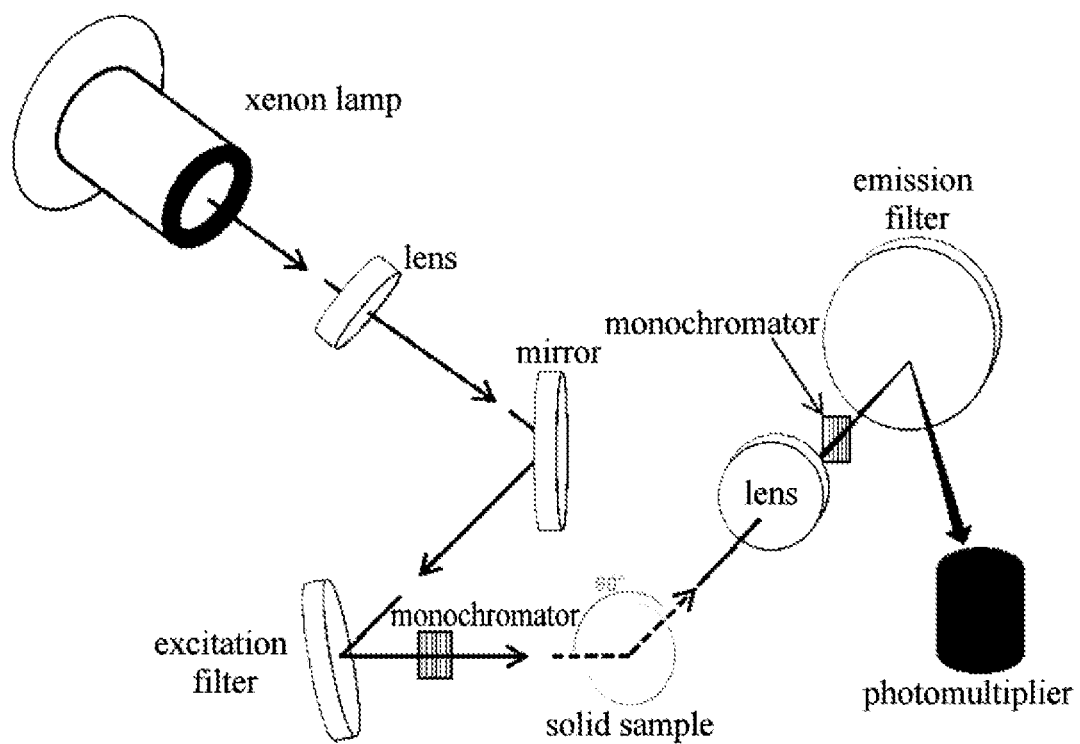
FIG. 5 shows a possible setup for time-resolved fluorescence detection of the complexes according to a particular embodiment of the invention. It is a setup used for detection by means of a solid support.

An example of a setup used for time-resolved fluorescence analysis using a solid support is proposed in FIG. 5.

According to one embodiment of the invention, marking may be done indirectly. The petroleum product, crude oil, biofuel or lubricant then only contains one of the constituents of the rare earth complex, namely the ligand or rare earth ion, and the complex is only formed at the moment of detection, by adding a developing solution comprising the other constituent, the rare earth ion or ligand, to form said complex. "Developing solution" means a solution comprising the other constituent in sufficient concentration to form a sufficient amount of complex to be detectable in time-resolved fluorescence in appropriate conditions. The following two embodiments thus also form part of the invention:

According to one embodiment of the invention, the method comprises the following steps:
a) Preparing a sample of petroleum product, crude oil, biofuel or lubricant comprising a ligand, said ligand being capable of forming a rare earth complex detectable by time-resolved fluorescence, after adding a developing solution comprising a rare earth salt;
b) Forming the rare earth complex by adding a developing solution comprising a rare earth salt;
c) Detecting the rare earth complex by time-resolved fluorescence.

According to another embodiment, the method comprises the following steps:
a) Preparing a sample of petroleum product, crude oil, biofuel or lubricant comprising a rare earth salt, said rare earth salt being capable of forming a rare earth complex detectable by time-resolved fluorescence, after adding a developing solution comprising a ligand;
b) Forming the rare earth complex by adding a developing solution comprising a ligand;

c) Detecting the rare earth complex by time-resolved fluorescence.

In the aforementioned methods of detection, the step of detecting the rare earth complex by time-resolved fluorescence may comprise the following substeps:
a) emitting pulsed light on the sample of petroleum product, crude oil, biofuel or lubricant,
b) detecting the light emitted by the sample after at least 100 nanoseconds, preferably at least 1 microsecond after the end of the exciting pulse, the detection of certain specific wavelengths of the rare earth complex making it possible to determine the presence of said complex in the sample.

EXAMPLES

The time-resolved fluorescence analyses were performed on a Varian Cary Eclipse spectrofluorometer or on an Agilent Cary Eclipse spectrofluorometer.

Unless stated otherwise, the microcuvettes used are Hellma® fluorescence quartz microcuvettes.

The ligands were purchased from CheMatech® (Dijon, France) and were used as supplied.

LH8, which is a ligand capable of forming a rare earth complex according to the invention, was purchased from Nano-H (Saint Quentin Fallavier, France) and was used as supplied.

The crude oil is from the Middle East.

1) Preparation of the Complexes

Example 1

20 mg of PCTA (2,2',2"-[3,6,9,15-tetraazabicyclo[9.3.1]pentadeca-1(15),11,13-triene-3,6,9-triyl]triacetic acid) is put in a 120-mL bottle. 100 mL of DMSO is added to the bottle, which is then shaken until the ligand has dispersed completely. A solution at 200 ppm of PCTA is thus obtained.

40 mg of europium trichloride hexahydrate ($EuCl_3.6H_2O$) is weighed in a 120-mL bottle. Then 100 mL of DMSO is added to the bottle, which is stirred for about 1 h. A solution at 400 ppm of $EuCl_3.6H_2O$ is thus obtained in the bottle.

1 mL of PCTA solution is put in a 15-mL bottle in the presence of 1 mL of $EuCl_3.6H_2O$ solution. The mixture is stirred, and then 8 mL of n-hexanol is added to the mixture. The system is then stirred at 50° C. for about 12 hours. A solution at 200 ppm of PCTA(Eu) is thus obtained.

Example 2

A solution of PCTA(Tb) complex is prepared according to the procedure described in example 1 using terbium trichloride hexahydrate ($TbCl_3.6H_2O$) instead of $EuCl_3.6H_2O$.

Example 3

A solution of PCTA(Dy) complex is prepared according to the procedure described in example 1 using dysprosium trichloride hexahydrate ($DyCl_3.6H_2O$) instead of $EuCl_3.6H_2O$.

Example 4

A solution of DOTA(Eu) complex is prepared according to the procedure described in example 1 using DOTA (2,2',2",2"'-(1,4,7,10-tetraazacyclododecane-1,4,7,10-tetrayl)tetraacetic acid) instead of PCTA.

Example 5

A solution of DOTA(Tb) complex is prepared according to the procedure described in example 1 using DOTA (2,2',2",2"'-(1,4,7,10-tetraazacyclododecane-1,4,7,10-tetrayl)tetraacetic acid) instead of PCTA and using terbium trichloride hexahydrate ($TbCl_3.6H_2O$) instead of $EuCl_3.6H_2O$.

Example 6

A solution of DOTA(Dy) complex is prepared according to the procedure described in example 1 using DOTA (2,2',2",2"'-(1,4,7,10-tetraazacyclododecane-1,4,7,10-tetrayl)tetraacetic acid) instead of PCTA and using dysprosium trichloride hexahydrate ($DyCl_3.6H_2O$) instead of $EuCl_3.6H_2O$.

Example 7

A solution of TMPAC(Eu) complex is prepared according to the procedure described in example 1 using TMPAC (tetra-6-(methylene)picolinic acid cyclen) instead of PCTA.

Example 8

A solution of TMPAC(Tb) complex is prepared according to the procedure described in example 1 using TMPAC (tetra-6-(methylene)picolinic acid cyclen) instead of PCTA and using terbium trichloride hexahydrate ($TbCl_3.6H_2O$) instead of $EuCl_3.6H_2O$.

Example 9

A solution of TMPAC(Dy) complex is prepared according to the procedure described in example 1 using TMPAC (tetra-6-(methylene)picolinic acid cyclen) instead of PCTA and using dysprosium trichloride hexahydrate ($DyCl_3.6H_2O$) instead of $EuCl_3.6H_2O$.

Figure 2A:
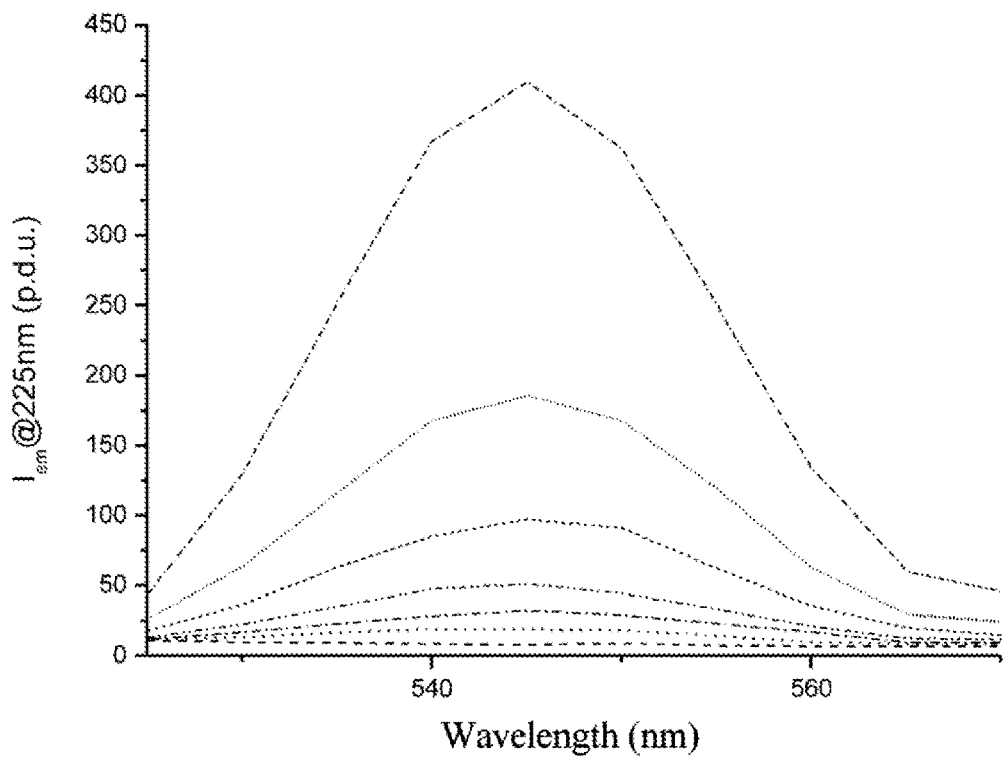
FIG. 2A shows the time-resolved emission spectra (delay 0.2 ms, acquisition time 1 ms, time for complete decrease 20 ms, accumulation of 1 s per point) under excitation at 225 nm of the marker DOTA(Tb) at different concentrations of n-hexanol prepared according to example 5. In increasing order of intensity at 540 nm, the curves represent, respectively: the reference (n-hexanol), 6.25, 12.5, 25, 50, 100 and 200 ppb of DOTA(Tb)
Figure 2B:
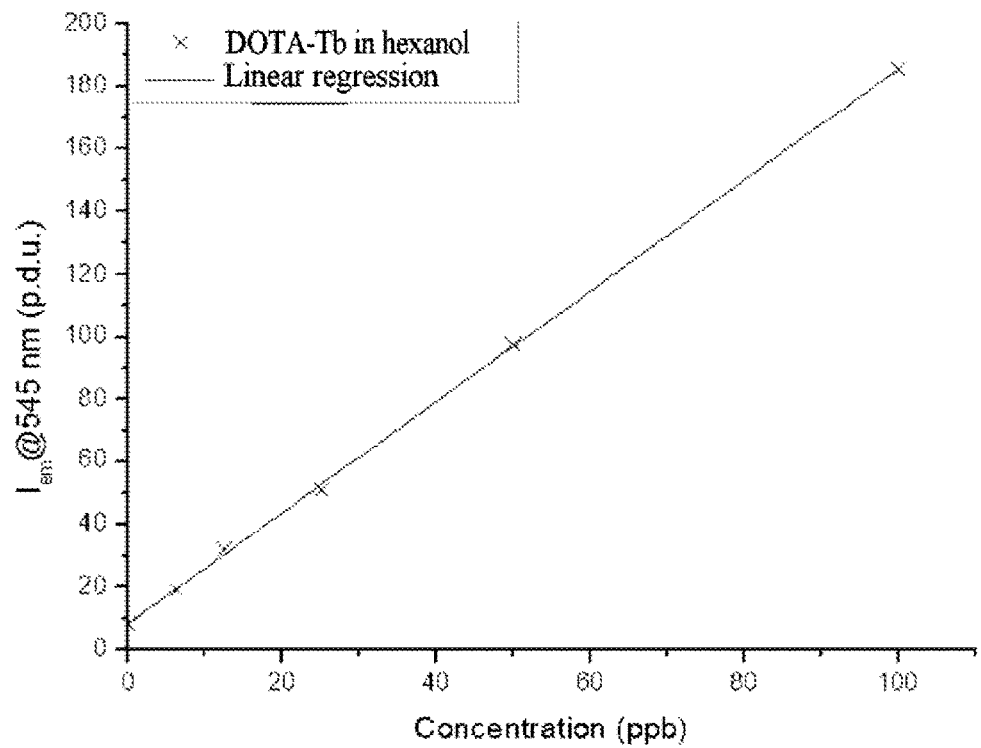
FIG. 2B shows the correlation between the concentration and the intensity of the emission signal.

FIGS. 1A, 1B, 1C and 1D show the time-resolved emission spectra of the complexes DOTA(Tb), DOTA(Eu), PCTA(Tb) and TMPAC(Tb) in n-hexanol. FIGS. 2A and 2B show the emission spectra of the DOTA(Tb) complex at different concentrations in n-hexanol and the correlation between the concentration and the emission intensity. These data show that it is possible to perform quantitative analyses of the complexes down to very low concentrations, below 100 ppb.

2) Detection of the Complexes in Lead-Free 95 and Gas Oil

The complexes obtained are tested as markers of lead-free 95 and of gas oil.

Example 10

A solution of PCTA(Tb) obtained according to example 2 is diluted in gas oil to reach a PCTA(Tb) concentration of 100 ppb. The solution obtained is then diluted 10-fold in n-hexanol. This mixture is analyzed by time-resolved fluorescence at a rate of 500 µl placed in a cuvette (ref: semimicro cuvette made of PMMA, BRAND®).

Example 11

A solution of PCTA(Tb) obtained according to example 2 is diluted in lead-free 95 to reach a PCTA(Tb) concentration of 100 ppb. The solution obtained is then diluted 10-fold in n-hexanol. This mixture is analyzed by time-resolved fluorescence at a rate of 500 µl placed in a cuvette (ref: semimicro cuvette made of PMMA, BRAND®).

Example 12

A solution of TMPAC(Tb) obtained according to example 8 is diluted in gas oil to reach a TMPAC(Tb) concentration of 100 ppb. The solution obtained is then diluted 10-fold in n-hexanol. This mixture is analyzed by time-resolved fluorescence at a rate of 500 µl placed in a cuvette (ref: semimicro cuvette made of PMMA, BRAND®).

Figure 3A:
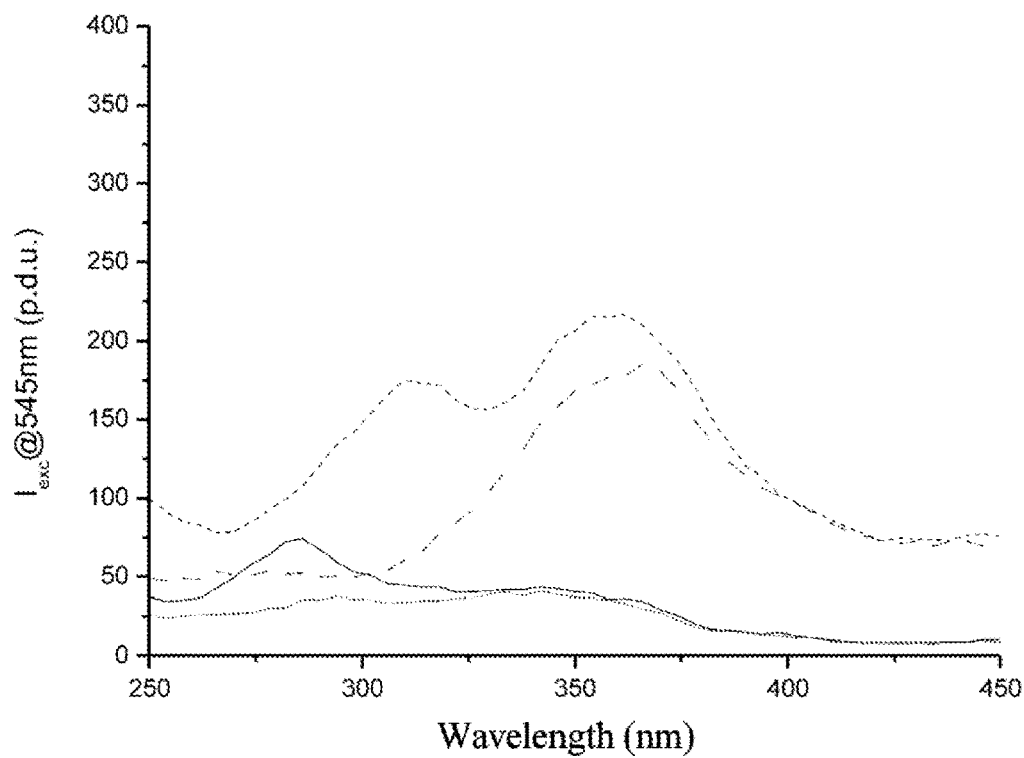
FIG. 3A shows, as a dashed line ( - - - ), the time-resolved excitation spectrum (delay 0.1 ms, acquisition time 1 ms, time for complete decrease 20 ms, accumulation of 0.05 s per point) considering the emission line at 545 nm of the marker PCTA(Tb) at 100 ppb in gas oil diluted 10-fold in n-hexanol according to example 10, and as a dot-and-dash line ( - • - ), the associated reference, corresponding to n-hexanol with 10% of gas oil, analyzed in the same conditions. This figure also shows, as a solid line ( — ), the time-resolved excitation spectrum of the marker PCTA(Tb) at 100 ppb in lead-free 95 prepared according to example 11 analyzed in the same conditions, and, as a dotted line ( • • • ), the associated reference, corresponding to n-hexanol with 10% of lead-free 95, analyzed in the same conditions.
Figure 3B:
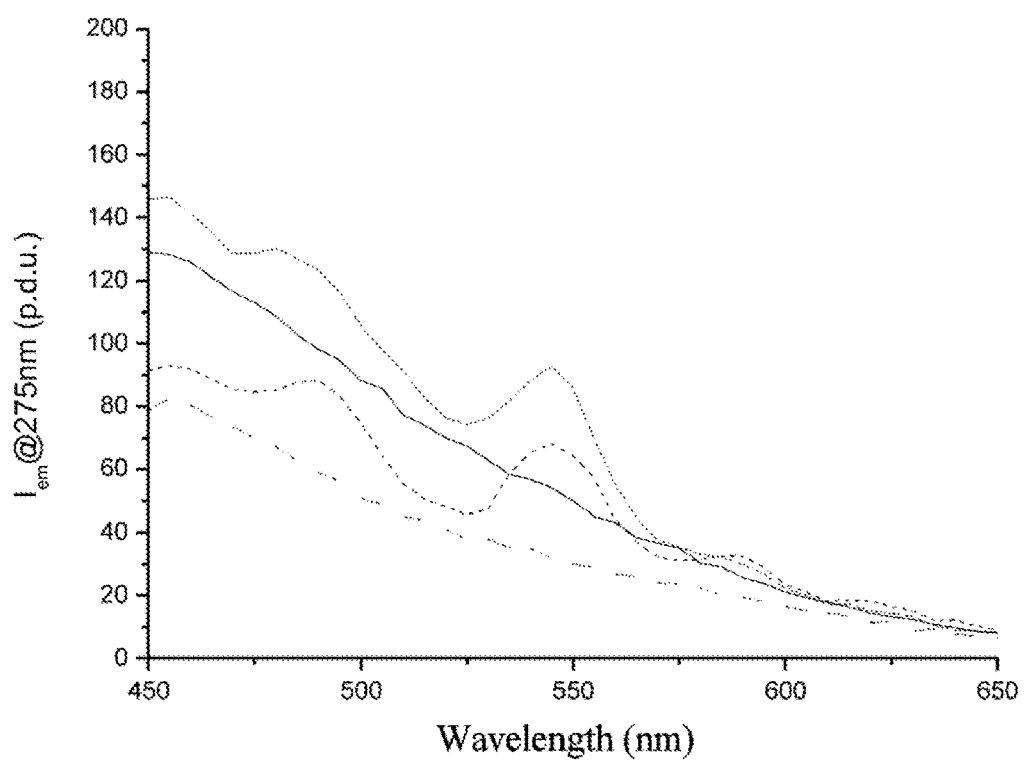
FIG. 3B shows, as a dotted line ( • • • ), the time-resolved emission spectrum (delay 0.1 ms, acquisition time 1 ms, time for complete decrease 10 ms, accumulation of 0.1 s per point) under excitation at 275 nm of the marker PCTA(Tb) at 100 ppb in gas oil diluted 10-fold in n-hexanol according to example 10, and as a solid line ( — ), the associated reference, corresponding to n-hexanol with 10% of gas oil, analyzed in the same conditions. This figure also shows, as a dashed line ( - - - ), the time-resolved emission spectrum of the marker PCTA(Tb) at 100 ppb in lead-free 95 prepared according to example 11 analyzed in the same conditions, and as a dot-and-dash line ( - • •- ), the associated reference, corresponding to n-hexanol with 10% of lead-free 95, analyzed in the same conditions.
Figure 4A:
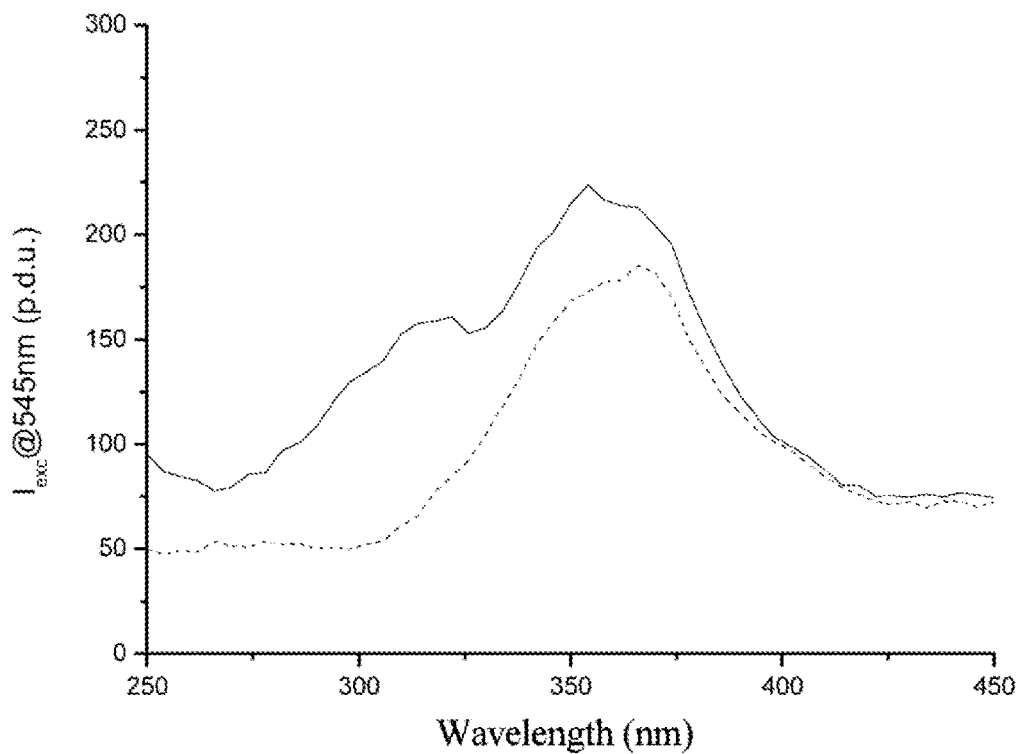
FIG. 4A shows, as a solid line, the time-resolved excitation spectrum (delay 0.1 ms, acquisition time 1 ms, time for complete decrease 20 ms, accumulation of 0.05 s per point) considering the emission line at 545 nm of the marker TMPAC(Tb) at 100 ppb in gas oil diluted 10-fold in n-hexanol according to example 12, and, as a broken line, the associated reference, corresponding to n-hexanol with 10% of gas oil, analyzed in the same conditions.
Figure 4B:
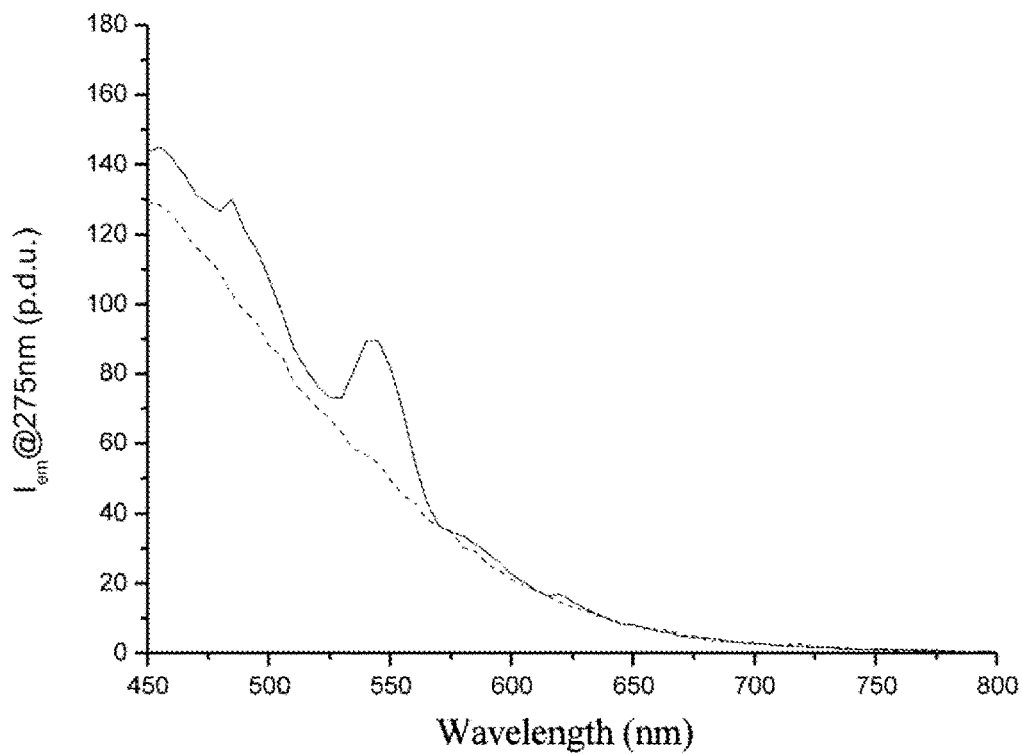
FIG. 4B shows, as a solid line, the time-resolved emission spectrum (delay 0.1 ms, acquisition time 5 ms, time for complete decrease 10 ms, accumulation of 0.1 s per point) under excitation at 275 nm of the marker TMPAC(Tb) at 100 ppb in gas oil diluted 10-fold in n-hexanol prepared according to example 12, and, as a broken line, the associated reference, corresponding to n-hexanol with 10% of gas oil, analyzed in the same conditions.

FIGS. 3 (A and B) and 4 (A and B) show respectively the time-resolved excitation and emission spectra of the PCTA (Tb) complex in lead-free 95 and gas oil and the time-resolved excitation and emission spectra of the TMPAC(Tb) complex in gas oil. These data show that lead-free 95 and gas oil may be marked with rare earth complexes.

3) Detection of the Complexes in Lead-Free 95 and Gas Oil Using a Solid Support

Example 13

A solution of PCTA(Tb) obtained according to example 2 is diluted in lead-free 95 to reach a PCTA(Tb) concentration of 100 ppb, 50 ppb or 25 ppb. After a nylon membrane (ref: Magna Nylon Membrane Filter 47 mm NY Membrane 0.45 µm) is left to incubate for 30 seconds in one of the solutions obtained, the membrane is analyzed by time-resolved fluorescence using a solid sample holder (ref: Agilent Cary Eclipse solid sample holder). The measurements are performed with a sample placed at 45° in the beam according to the setup shown in FIG. 5.

Example 14

A solution of TMPAC(Tb) obtained according to example 8 is diluted in lead-free 95 to reach a TMPAC(Tb) concentration of 50 ppb or 25 ppb, and is then analyzed according to the protocol described in example 13.

Example 15

A solution of PCTA(Eu) obtained according to example 1 is diluted in lead-free 95 to reach a concentration of PCTA (Eu) of 200 ppb or 50 ppb, and then the mixture is analyzed according to the protocol described in example 13.

Example 16

A solution of TMPAC(Eu) obtained according to example 7 is diluted in lead-free 95 to reach a TMPAC(Eu) concentration of 200 ppb or 50 ppb, and then the mixture is analyzed according to the protocol described in example 13.

Example 17

A solution of TMPAC(Eu) obtained according to example 7 is diluted in gas oil to reach a TMPAC(Eu) concentration of 200 ppb or 50 ppb. The solution is then diluted 10-fold in isopropanol and then the mixture is analyzed according to the protocol described in example 13.

Figure 6A:
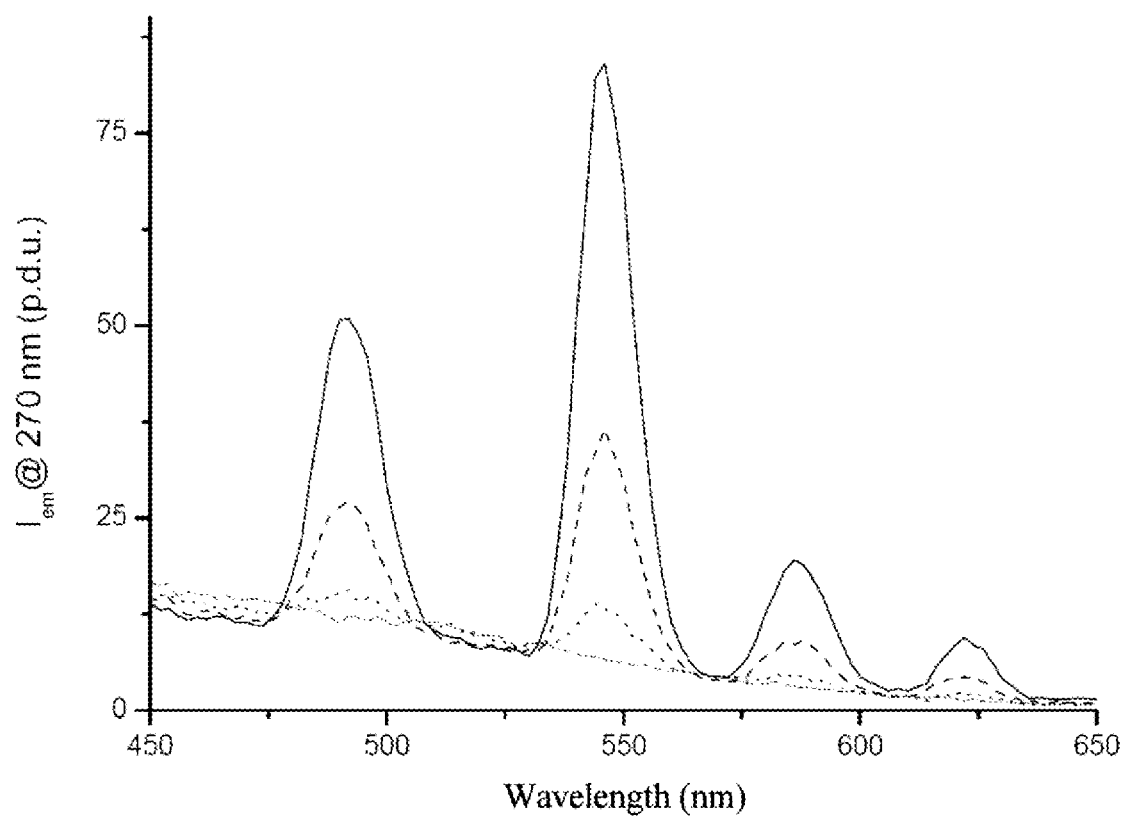
FIG. 6A shows the time-resolved emission spectra (delay 0.1 ms, acquisition time 5 ms, time for complete decrease 10 ms, accumulation of 0.1 s per point) under excitation at 270 nm of the marker PCTA(Tb) at different concentrations of lead-free 95 prepared according to example 13. In increasing order of intensity at 550 nm, the curves represent, respectively: the reference (lead-free 95), 25, 50 and 100 ppb of PCTA(Tb).
Figure 6B:
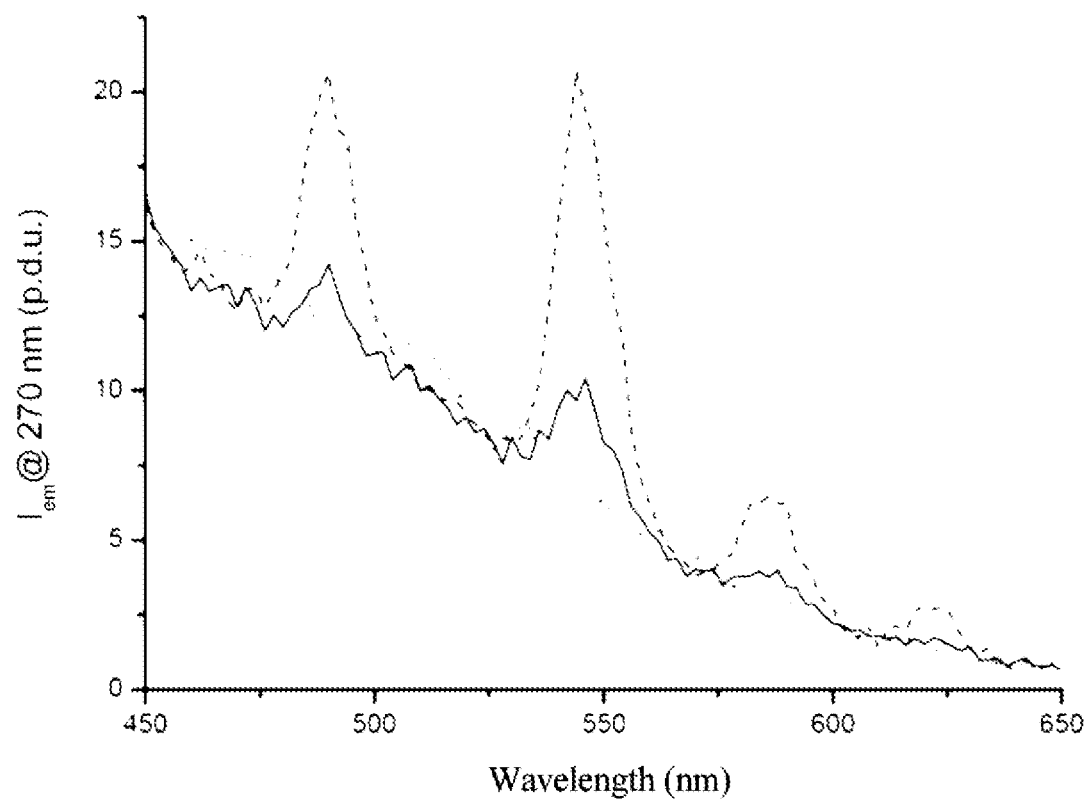
FIG. 6B shows the time-resolved emission spectra (delay 0.1 ms, acquisition time 5 ms, time for complete decrease 10 ms, accumulation of 0.1 s per point) under excitation at 270 nm of the marker TMPAC(Tb) at different concentrations of lead-free 95 prepared according to example 14. In increasing order of intensity at 550 nm, the curves represent, respectively: the reference (lead-free 95), 25 and 50 ppb of TMPAC(Tb).
Figure 7A:
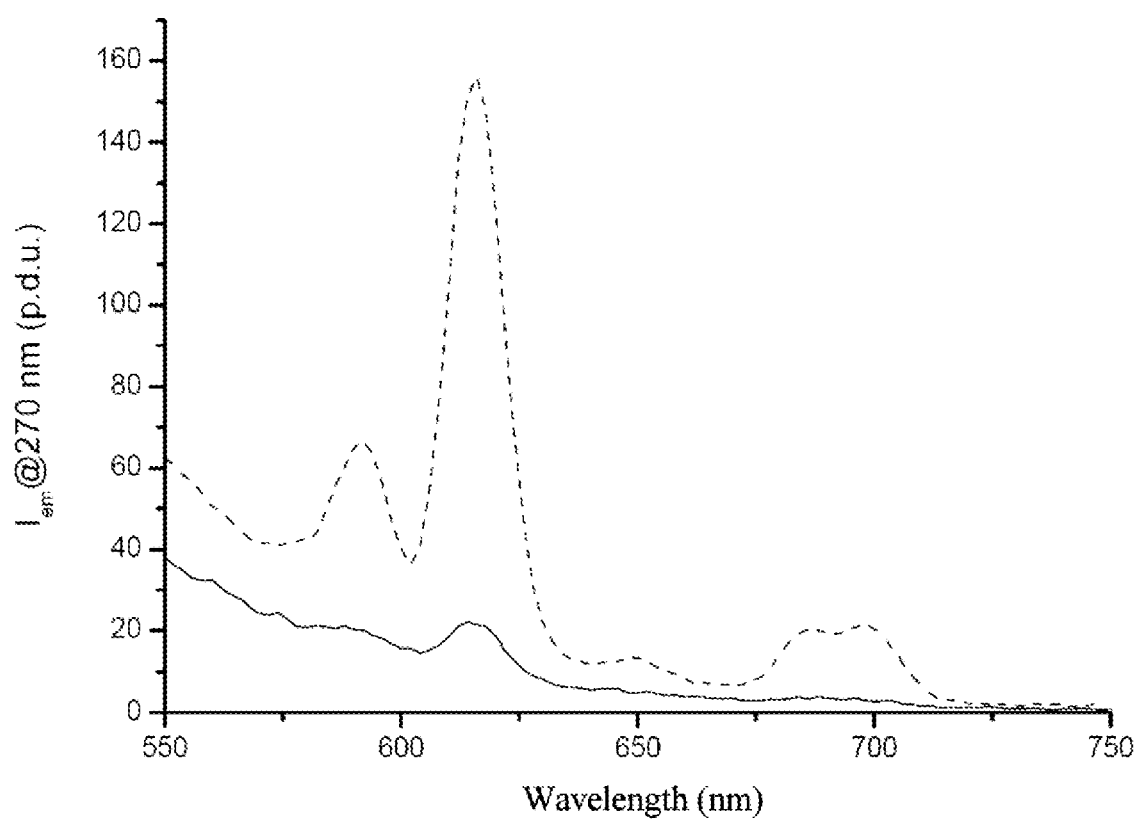
FIG. 7A shows, as a solid line, the time-resolved emission spectrum (delay 0.1 ms, acquisition time 5 ms, time for complete decrease 10 ms, accumulation of 0.1 s per point) under excitation at 270 nm of the marker PCTA(Eu) at 50 ppb in lead-free 95 and, as a broken line, the same marker at 200 ppb in lead-free 95, both prepared according to example 15.
Figure 7B:
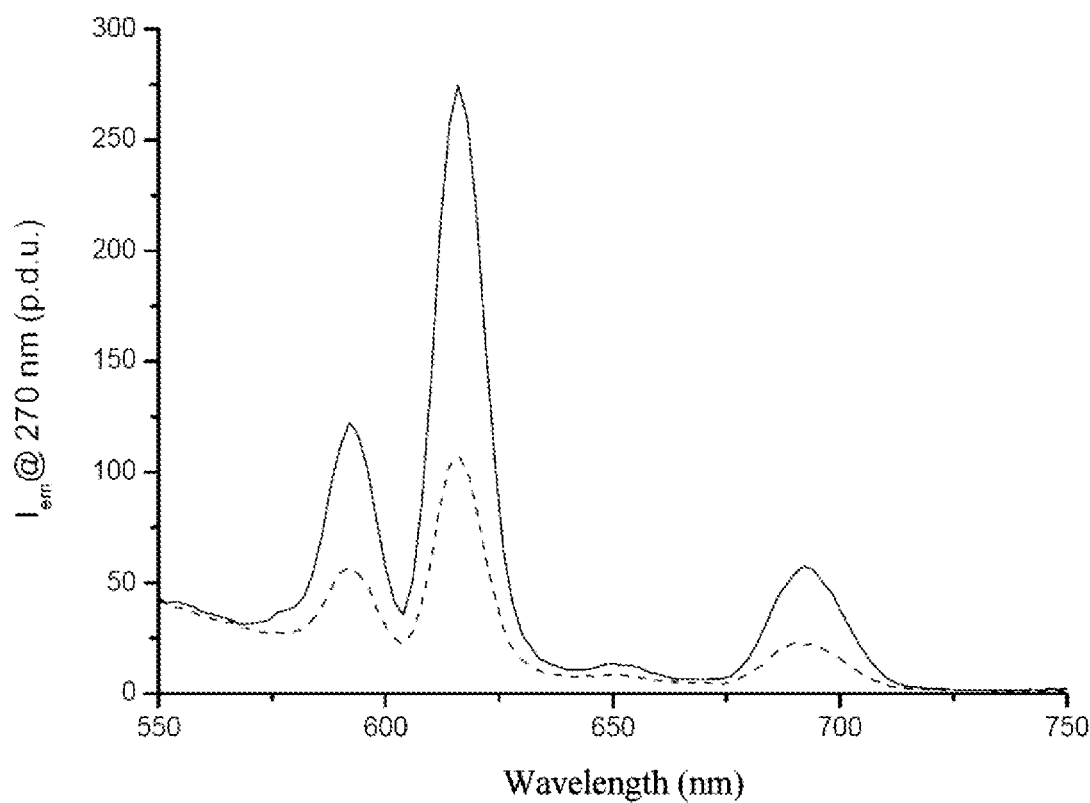
FIG. 7B shows, as a solid line, the time-resolved emission spectrum (delay 0.1 ms, acquisition time 5 ms, time for complete decrease 10 ms, accumulation of 0.1 s per point) under excitation at 270 nm of the marker TMPAC(Eu) at 200 ppb in lead-free 95 and, as a broken line, the same marker at 50 ppb in lead-free 95, both prepared according to example 16.
Figure 7C:
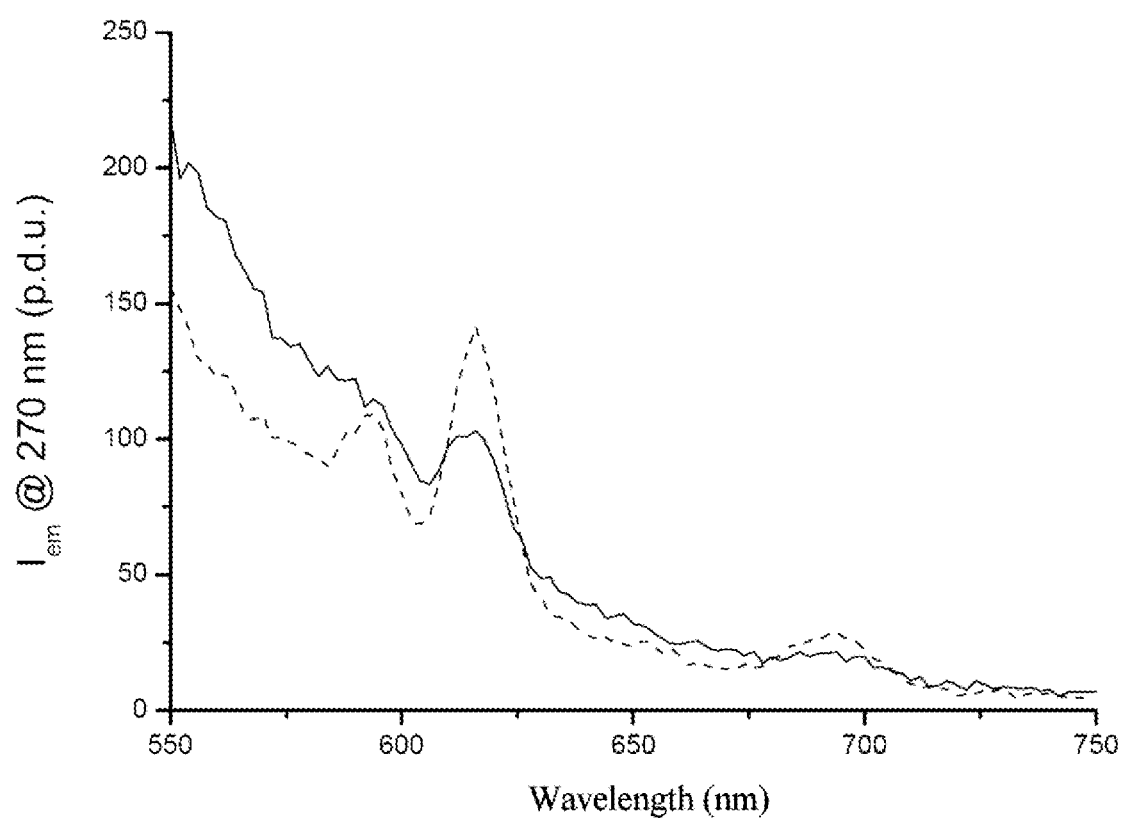
FIG. 7C shows, as a solid line, the time-resolved emission spectrum (delay 0.1 ms, acquisition time 5 ms, time for complete decrease 10 ms, accumulation of 0.1 s per point) under excitation at 270 nm of the marker TMPAC(Eu) at 5 ppb in gas oil and, as a broken line, the same marker at 20 ppb in gas oil, both prepared according to example 17.

FIGS. 6A and 6B show the time-resolved emission spectra of the PCTA(Tb) and TMPAC(Tb) complexes in lead-free 95. FIGS. 7A and 7B show the time-resolved emission spectra of the PCTA(Eu) and TMPAC(Eu) complexes in lead-free 95. FIG. 7C shows the time-resolved emission spectrum of the TMPAC(Eu) complex in gas oil. These data show that these complexes are detectable in lead-free 95 and gas oil at quantities below 100 ppb, and down to 25 ppb for certain complexes.

4) Detection of the Complexes in Lead-Free 95 and Gas Oil by Extraction Using an Immiscible Solution Example 18

A solution of DOTA(Tb) obtained according to example 5 is diluted in lead-free 95 to reach a DOTA(Tb) concentration of 100 ppb. This solution is then diluted in lead-free 95 to reach the desired DOTA(Tb) concentration and 25 mL is mixed with 5 mL of ultrapure water in a suitable bottle. The whole is stirred vigorously for 30 seconds. The bottle is then opened to allow the two phases to separate. After about 10 minutes, 500 µl of the aqueous phase is taken and then analyzed by time-resolved fluorescence in a microcuvette. Between each analysis, the microcuvette is first washed with hydrochloric acid (12 M) and then rinsed with plenty of water and finally with ethanol.

Example 19

A solution of DOTA(Tb) obtained according to example 5 is diluted in gas oil to reach a DOTA(Tb) concentration of 100 ppb. This solution is then diluted in gas oil to reach the desired DOTA(Tb) concentration and 25 mL is mixed with 5 mL of ultrapure water in a suitable bottle. The whole is stirred vigorously for 30 seconds. The bottle is then opened to allow the two phases to separate. After about 10 minutes, 500 µl of the aqueous phase is taken and then analyzed by time-resolved fluorescence in a microcuvette. Between each analysis, the microcuvette is first washed with hydrochloric acid (12 M) and then rinsed with plenty of water and finally with ethanol.

Example 20

A solution of DOTA(Tb) obtained according to example 5 is diluted in lead-free 95 to reach a DOTA(Tb) concentration of 80 ppb. This solution is then diluted in lead-free 95 to reach a DOTA(Tb) concentration of 0.8 ppb, and 100 mL is mixed with 10 mL of ultrapure water in a single-necked 250-mL flask. The mixture is stirred vigorously. Then about 95 mL of the mixture is evaporated. 5 mL of water is then added and the mixture is stirred. After standing for 5 minutes, 500 µl of the aqueous phase is taken and then analyzed by time-resolved fluorescence in a microcuvette.

Figure 8A:
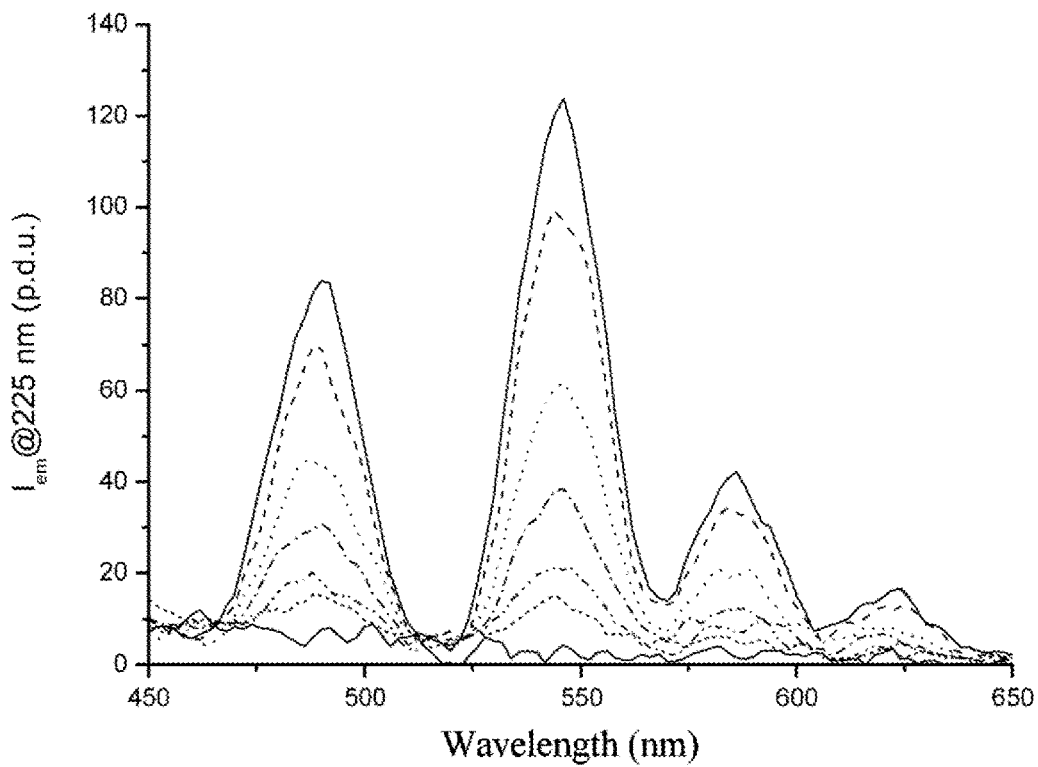
FIG. 8A shows the time-resolved emission spectra (delay 0.5 ms, acquisition time 1 ms, time for complete decrease 20 ms, accumulation of 0.1 s per point) under excitation at 225 nm of the marker DOTA(Tb) at different concentrations of lead-free 95 prepared according to example 18. In increasing order of intensity at 550 nm, the curves represent, respectively: the reference (lead-free 95), 5.76, 11.52, 23.04, 38.40, 64.00 and 80.00 ppb of DOTA(Tb).
Figure 8B:
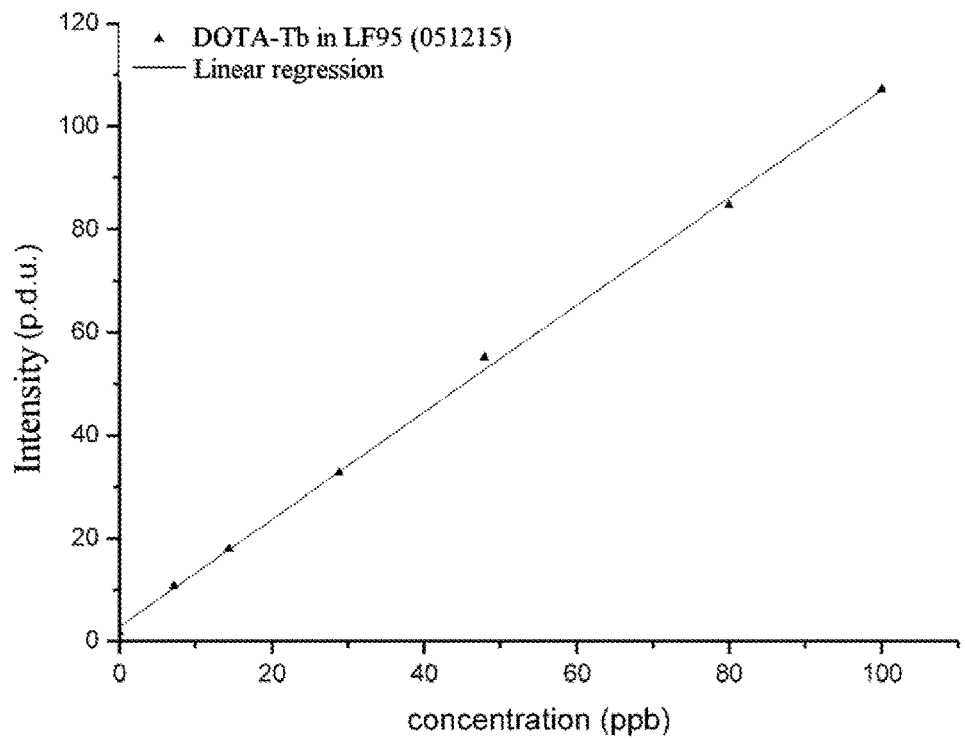
FIG. 8B shows the correlation between the concentration and the intensity of the emission signal.
Figure 9A:
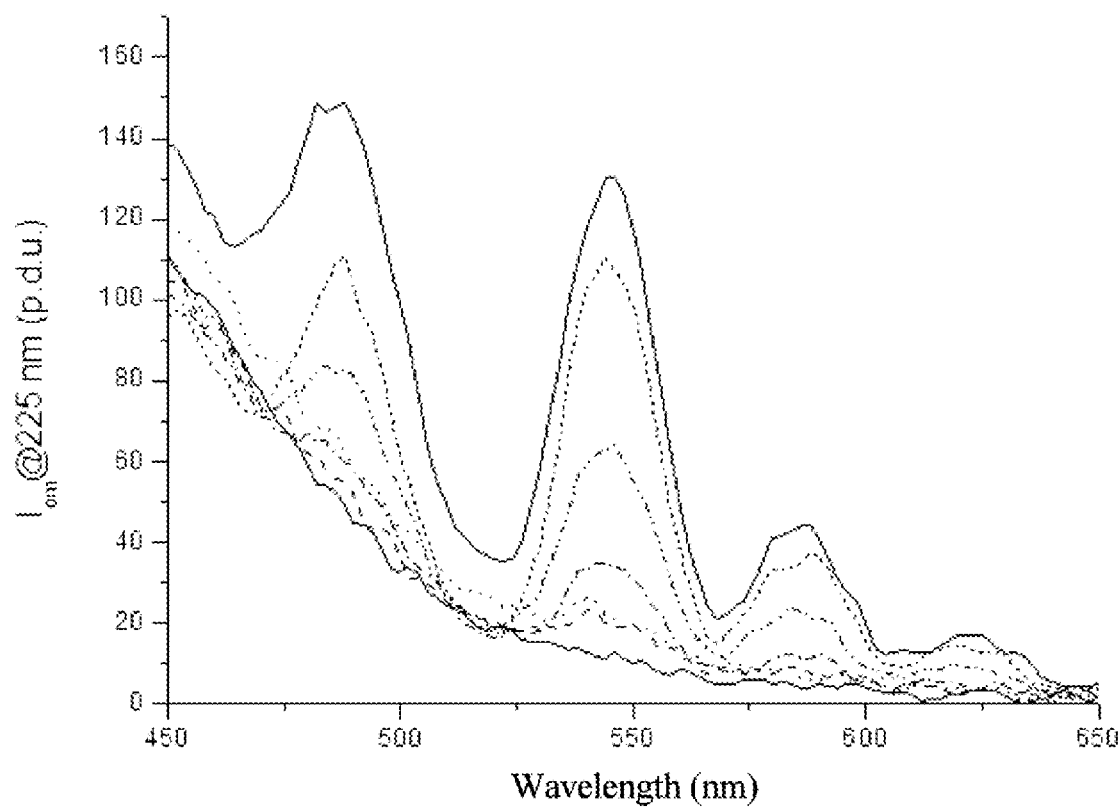
FIG. 9A shows the time-resolved emission spectra (delay 0.5 ms, acquisition time 1 ms, time for complete decrease 20 ms, accumulation of 0.1 s per point) under excitation at 225 nm of the marker DOTA(Tb) at different concentrations of gas oil prepared according to example 19. In increasing order of intensity at 550 nm, the curves represent, respectively: the reference (gas oil), 5, 10, 20, 40, 60 and 80 ppb of DOTA(Tb).
Figure 9B:
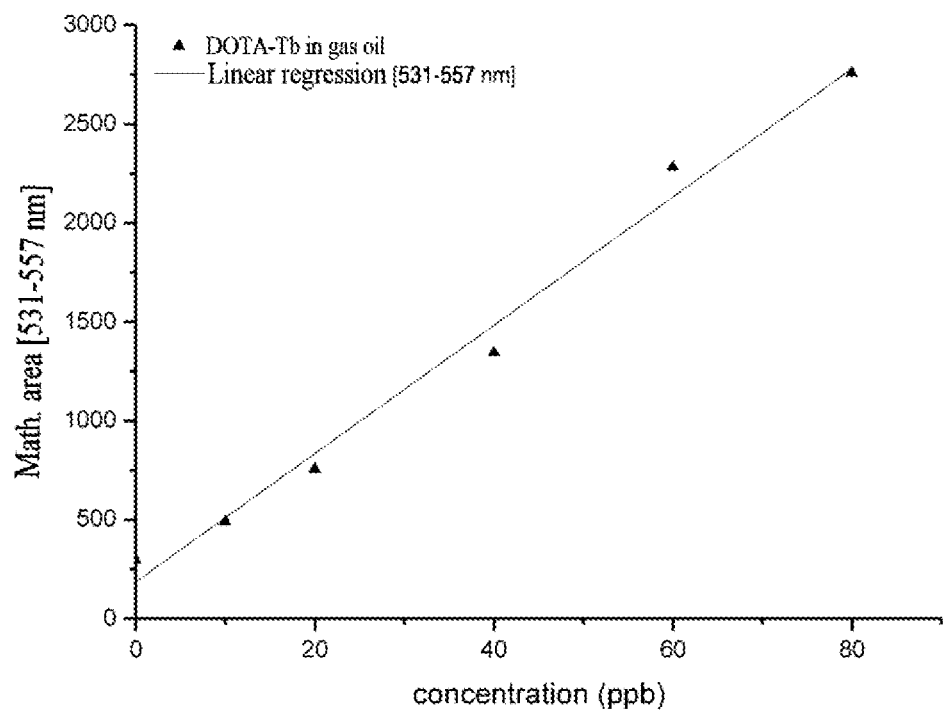
FIG. 9B shows the correlation between the concentration and the area of the emission signal between 531 and 557 nm.

FIGS. 8 (A and B) and 9 (A and B) show the time-resolved emission spectra of the DOTA(Tb) complex at different concentrations of lead-free 95 and gas oil and the correlation between the concentration and the emission intensity. These data show that it is possible to perform quantitative analyses of rare earth complexes in these fuels down to very low concentrations.

Figure 10:
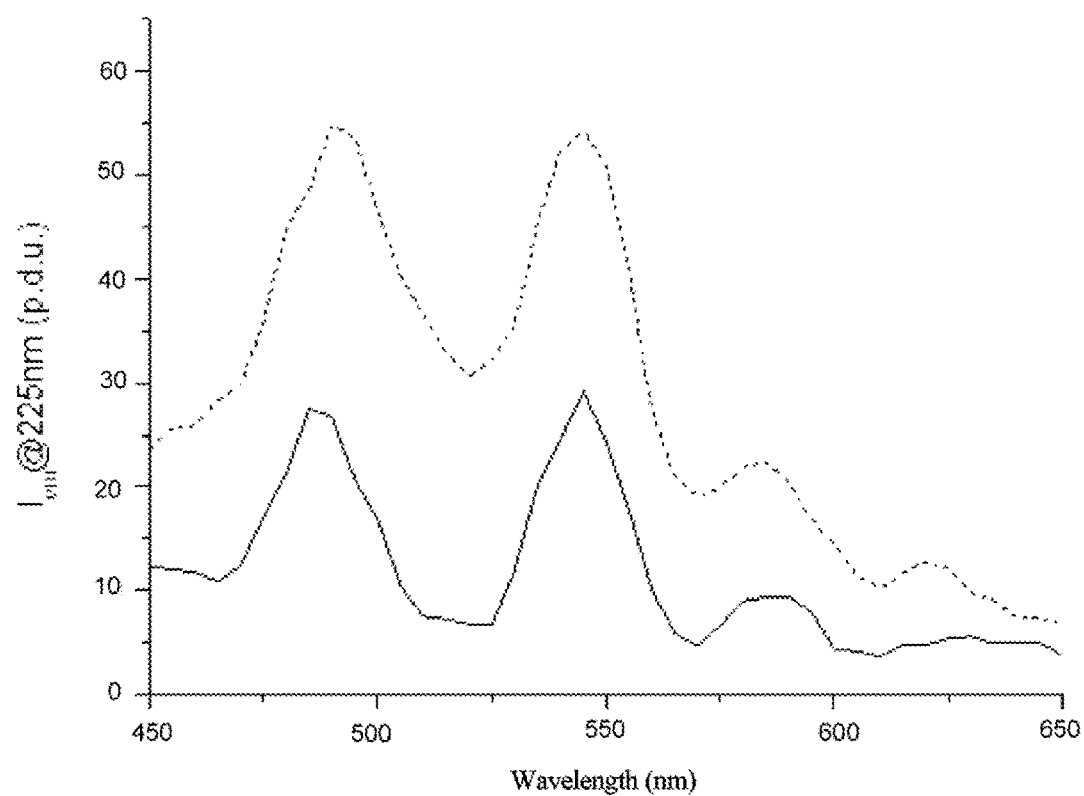
FIG. 10 shows the time-resolved emission spectrum of the marker DOTA(Tb) at 0.8 ppb in lead-free 95 prepared according to example 20. The solid line corresponds to an analysis with a delay of 0.5 ms, an acquisition time of 1 ms and a time for complete decrease of 20 ms with an accumulation of 1 s per point. The broken line corresponds to an analysis with a delay of 0.2 ms, an acquisition time of 1 ms and a time for complete decrease of 20 ms with an accumulation of 1 s per point.

FIG. 10 shows the time-resolved emission spectrum of the DOTA(Tb) complex at 0.8 ppb in lead-free 95. These data show that detection of the rare earth complexes as markers may be performed at concentrations below 1 ppb.

5) Detection of the Complexes in Crude Oil

Example 21

A solution of DOTA(Tb) obtained according to example 5 is diluted in n-hexanol to reach a DOTA(Tb) concentration of 10 ppm. 100 mL of crude oil is then marked at 160 ppb using this solution. After adding 10 mL of water to the marked crude oil, the mixture is stirred for at least 1 hour. The whole is put in a 250-mL separating funnel. 100 mL of cyclohexane is then added. After closing the funnel, it is shaken, taking care to degas the system under pressure. The funnel is then left to stand after opening. Once the phases have separated, the aqueous phase is taken and then analyzed by time-resolved fluorescence in a microcuvette.

Figure 11:
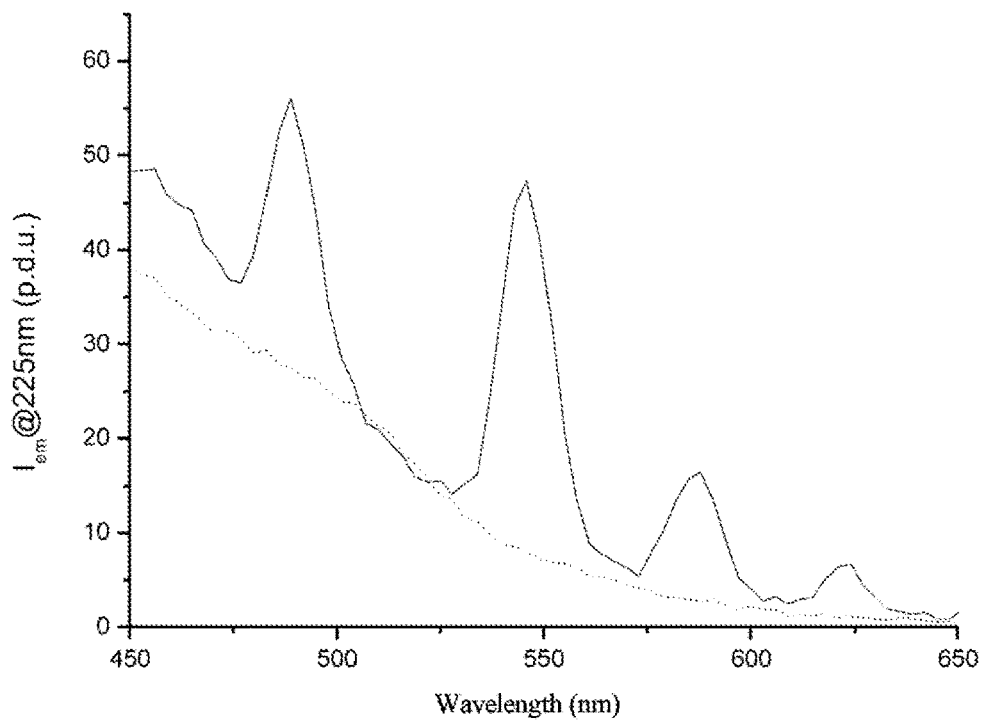
FIG. 11 shows, as a solid line, the time-resolved emission spectrum (delay 0.5 ms, acquisition time 1 ms, time for complete decrease 20 ms, accumulation of 1.5 s per point) under excitation at 225 nm of the marker DOTA(Tb) at 160 ppb in crude oil prepared according to example 21. The broken line represents the associated reference, corresponding to unmarked crude oil, analyzed in the same conditions.

FIG. 11 shows the emission spectrum of the DOTA(Tb) complex in crude oil. These data show that it is also possible to use the rare earth complexes as markers of crude oils.

6) Indirect Marking

Example 22

Preparation of a Europium Developing Solution 100 mg of europium chloride hexahydrate ($EuCl_3.6H_2O$) is weighed in a 100-mL bottle and 100 mL of water is added. 2.5 mL of the solution obtained is then put in a 50-mL bottle and 47.5 mL of n-hexanol is added.

Example 23

Preparation of LH8 Developing Solution in an Organic Medium (5% $H_2O$)

10 mg of LH8 is weighed in a 100-mL bottle and 100 mL of ultrapure water is added. The mixture is stirred for about 10 minutes. 2.5 mL of the solution obtained is put in a 60-mL bottle containing 47.5 mL of n-hexanol with stirring.

Example 24

Preparation of LH8 Developing Solution in an Aqueous Medium 10 mg of LH8 is weighed in a 100-mL bottle and 100 mL of ultrapure water is added. The mixture is stirred for about 10 minutes. 2.5 mL of the solution obtained is put in a 60-mL bottle. 47.5 mL of ultrapure water is then added and the system is stirred.

Example 25

Preparation of a Solution of Ligand (Marker)

20 mg of 1,3-dipyridin-3-yl-propane-1,3-dione is weighed in a 100-mL bottle and 100 mL of n-hexanol is then added. A solution at 200 ppm is thus obtained.

Example 26

Preparation of a Solution of Europium (Marker)

10 mL of europium chloride solution prepared according to example 1 and 90 mL of n-hexanol are put in a 100-mL bottle and the system is stirred. A solution at 40 ppm is thus obtained.

Example 27

Preparation of a Solution of Terbium (Marker)

10 mL of terbium chloride solution prepared according to example 2 and 90 mL of n-hexanol are put in a 100-mL bottle and the system is stirred. A solution at 40 ppm is thus obtained.

Example 28

250 µL of solution of ligand prepared according to example 25 is put in a 10-mL bottle and 9.75 mL of gas oil is then added. This solution of ligand at 5 ppm is then diluted in gas oil to the desired concentration. 1 mL of the solution obtained is mixed with 1 mL of europium developing solution, prepared according to example 22, in a cuvette (ref: Sarstedt® PMMA cuvette, 2.5-4.5 mL). 100 µL of ultrapure water is then added to the cuvette. After about 10 minutes, the contents of the cuvette are analyzed by time-resolved fluorescence.

Example 29

250 µL of the solution of ligand prepared according to example 25 is put in a 10-mL bottle and 9.75 mL of lead-free 95 is then added. This solution of ligand at 5 ppm is then diluted in lead-free 95 to the desired concentration. 1 mL of the solution obtained is mixed with 1 mL of europium developing solution, prepared according to example 22, in a cuvette (ref: Sarstedt® PMMA cuvette, 2.5-4.5 mL). 100 µL of ultrapure water is then added to the cuvette. After about 10 minutes, the contents of the cuvette are analyzed by time-resolved fluorescence.

Figure 12A:
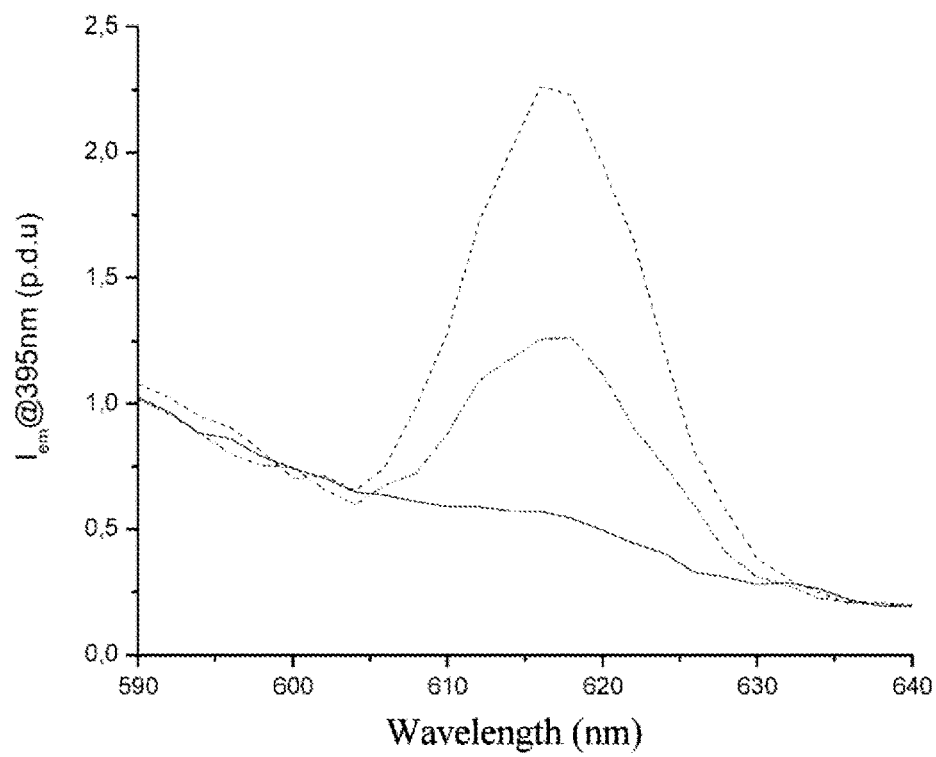
FIG. 12A shows the time-resolved emission spectrum (delay 0.1 ms, acquisition time 5 ms, time for complete decrease 10 ms, accumulation of 0.1 s per point) under excitation at 395 nm of the ligand at different concentrations of gas oil prepared according to example 28. In increasing order of intensity at 620 nm, the curves represent, respectively: the reference (gas oil), 100 and 200 ppb of ligand.
Figure 12B:
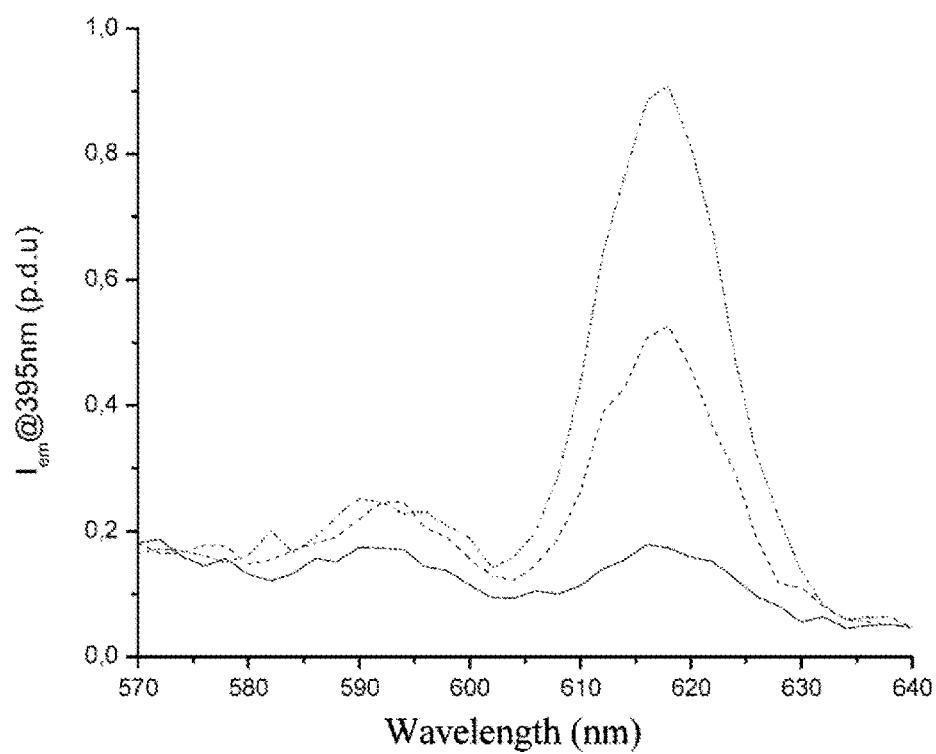
FIG. 12B shows the time-resolved emission spectrum (delay 0.1 ms, acquisition time 5 ms, time for complete decrease 10 ms, accumulation of 0.1 s per point) under excitation at 395 nm of the ligand at different concentrations of lead-free 95 prepared according to example 29. In increasing order of intensity at 620 nm, the curves represent, respectively: the reference (lead-free 95), 100 and 200 ppb of the ligand.

FIGS. 12A and 12B show the time-resolved emission spectra of the rare earth complex after adding a developing solution to a solution of ligand in gas oil and in lead-free gasoline 95. These data show that it is possible to perform indirect marking by adding only the ligand to the petroleum product.

Example 30

250 µL of the terbium chloride solution prepared according to example 27 is put in a 60-mL bottle with 49.75 mL of lead-free gasoline 95. The system is then stirred. This solution at 200 ppb of rare earth salt is then diluted in lead-free 95 to the desired concentration. 200 µL of the solution obtained is mixed with 1.8 mL of developing solution, prepared according to example 23, in a cuvette (ref: Sarstedt® PMMA cuvette 2.5-4.5 mL). After about 10 minutes, the contents of the cuvette are analyzed by time-resolved fluorescence.

Example 31

250 µL of the europium chloride solution prepared according to example 26 is put in a 60-mL bottle with 49.75 mL of lead-free 95. The system is then stirred. This solution at 200 ppb of rare earth salt is then diluted in lead-free 95 to the desired concentration. 200 µL of the solution obtained is mixed with 1.8 mL of developing solution prepared according to example 23 in a cuvette (ref: Sarstedt® PMMA cuvette 2.5-4.5 mL). After about 10 minutes, the contents of the cuvette are analyzed by time-resolved fluorescence.

Figure 13A:
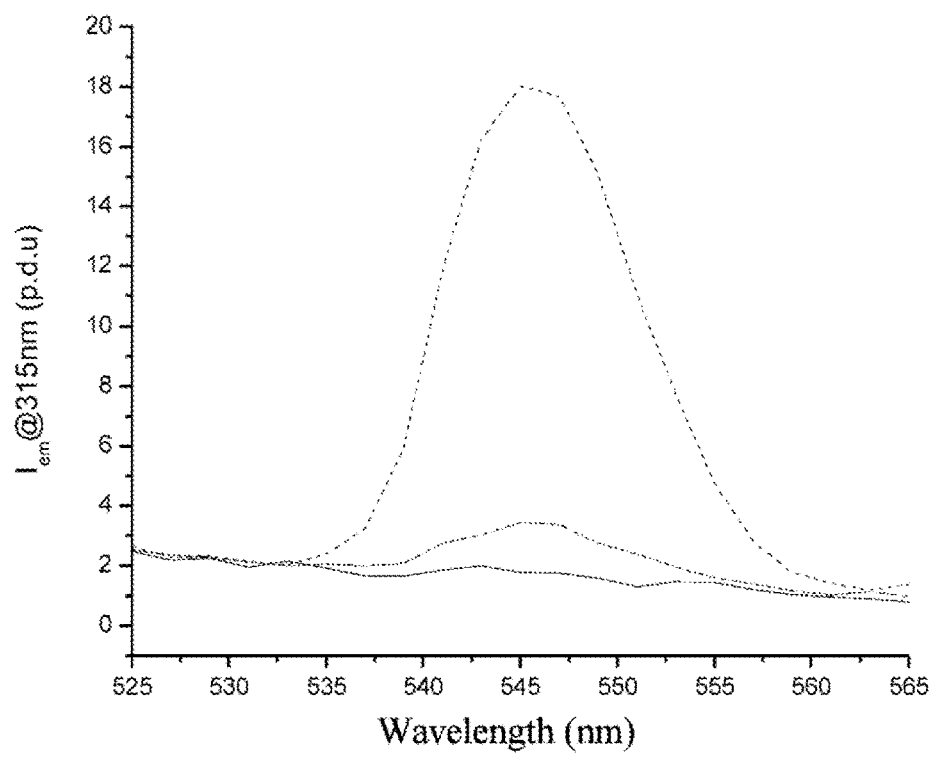
FIG. 13A shows the time-resolved emission spectrum (delay 0.1 ms, acquisition time 5 ms, time for complete decrease 10 ms, accumulation of 0.1 s per point) under excitation at 315 nm of the terbium salt at different concentrations of lead-free 95 prepared according to example 30. In increasing order of intensity at 545 nm, the curves represent, respectively: the reference (lead-free 95), 10 and 100 ppb of terbium salt.
Figure 13B:
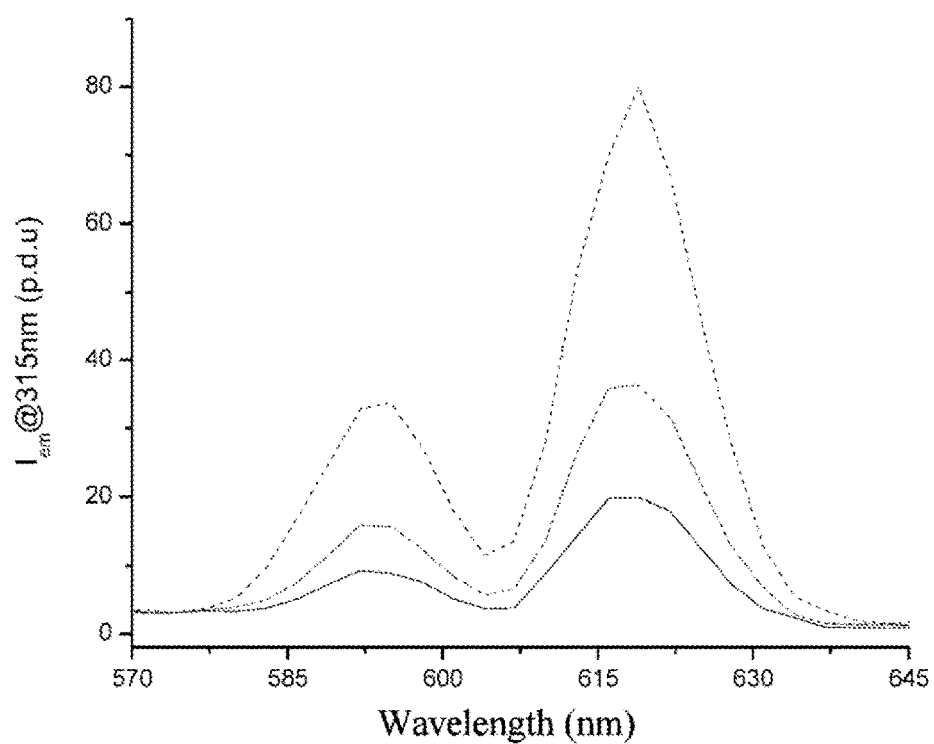
FIG. 13B shows the time-resolved emission spectrum (delay 0.1 ms, acquisition time 5 ms, time for complete decrease 10 ms, accumulation of 0.1 s per point) under excitation at 315 nm of the europium salt at different concentrations of lead-free 95 prepared according to example 31. In increasing order of intensity at 615 nm, the curves represent, respectively: 37.5, 50 and 100 ppb of europium salt.

FIGS. 13A and 13B show the time-resolved emission spectra of the complex after adding a developing solution to a solution of rare earth salt in lead-free gasoline 95. These data show that it is possible to perform indirect marking by adding only the rare earth salt to the petroleum product.

Example 32

250 µL of the terbium chloride solution prepared in example 27 is put in a 60-mL bottle with 49.75 mL of crude oil. The system is then stirred. 2 mL of the solution at 200 ppb of rare earth salt obtained is put in a 50-mL centrifuge tube and 18 mL of developing solution prepared according to example 24 is then added. The sample is stirred vigorously for 30 seconds and then centrifuged at 1500 rpm for 5 minutes. 3 mL of aqueous phase is taken and is put in a cuvette (ref: Sarstedt® PMMA cuvette 2.5-4.5 mL). The contents of the cuvette are then analyzed by time-resolved fluorescence.

Example 33

250 μL of the europium chloride solution prepared in example 26 is put in a 60-mL bottle with 49.75 mL of crude oil. The system is then stirred. 2 mL of the solution at 200 ppb of rare earth salt obtained is put in a 50-mL centrifuge tube and 18 mL of developing solution prepared according to example 24 is then added. The sample thus prepared is stirred vigorously for 30 seconds and then centrifuged at 1500 rpm for 5 minutes. 3 mL of aqueous phase is taken and is put in a cuvette (ref: Sarstedt® PMMA cuvette 2.5-4.5 mL). The contents of the cuvette are then analyzed by time-resolved fluorescence.

Figure 14A:
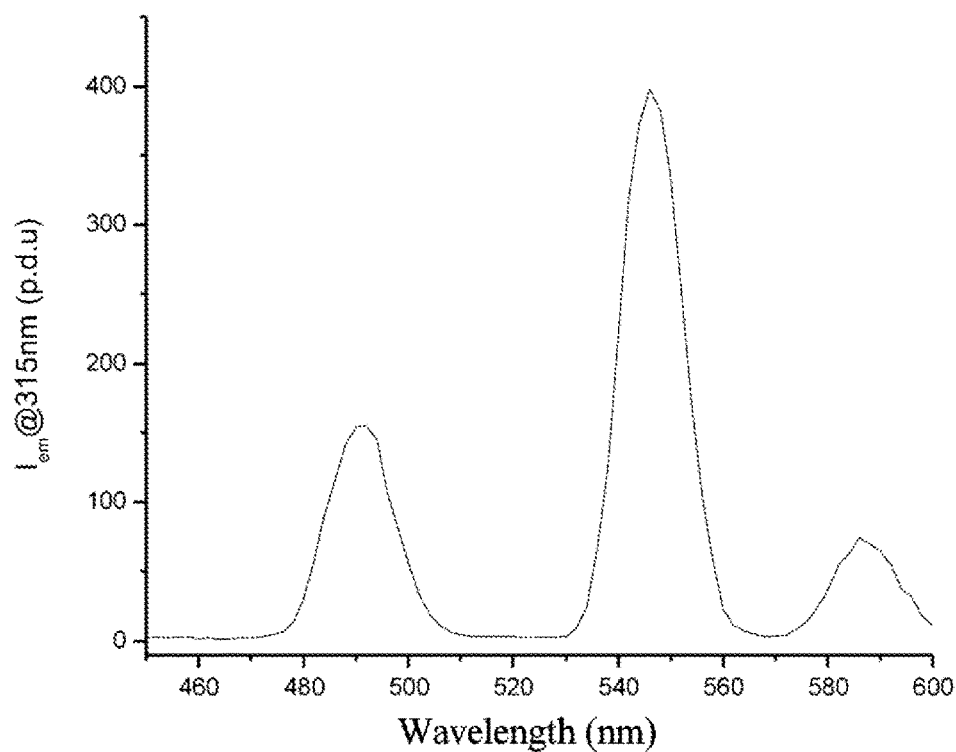
FIG. 14A shows the time-resolved emission spectrum (delay 0.1 ms, acquisition time 5 ms, time for complete decrease 10 ms, accumulation of 0.1 s per point) under excitation at 315 nm of the terbium salt at 200 ppb in crude oil prepared according to example 32
Figure 14B:
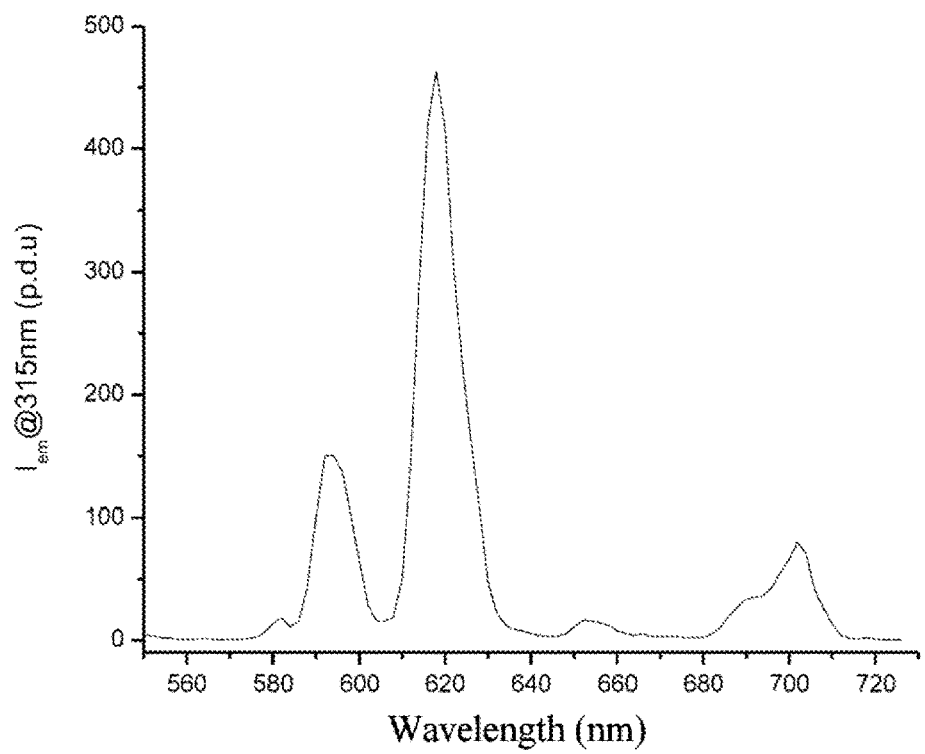
FIG. 14B shows the time-resolved emission spectrum (delay 0.1 ms, acquisition time 5 ms, time for complete decrease 10 ms, accumulation of 0.1 s per point) under excitation at 315 nm of the europium salt at 200 ppb in crude oil prepared according to example 33.

FIGS. 14A and 14B show the time-resolved emission spectra of the complexes of europium and of terbium after adding a developing solution to the crude oil comprising a rare earth salt. These data show that it is also possible to perform indirect marking in crude oil.

Example 34

Solutions of lead-free 95 comprising both terbium salt and europium salt are prepared. The different concentrations are obtained after successive dilutions starting from stock solutions of lead-free gasoline 95 marked with 200 ppb of terbium or europium salt (examples 27 and 26 respectively). 200 μL of the solution obtained is mixed with 1.8 mL of developing solution, prepared according to example 23, in a cuvette (ref: Sarstedt® PMMA cuvette 2.5-4.5 mL). The contents of the cuvette are then analyzed by time-resolved fluorescence.

Figure 15:
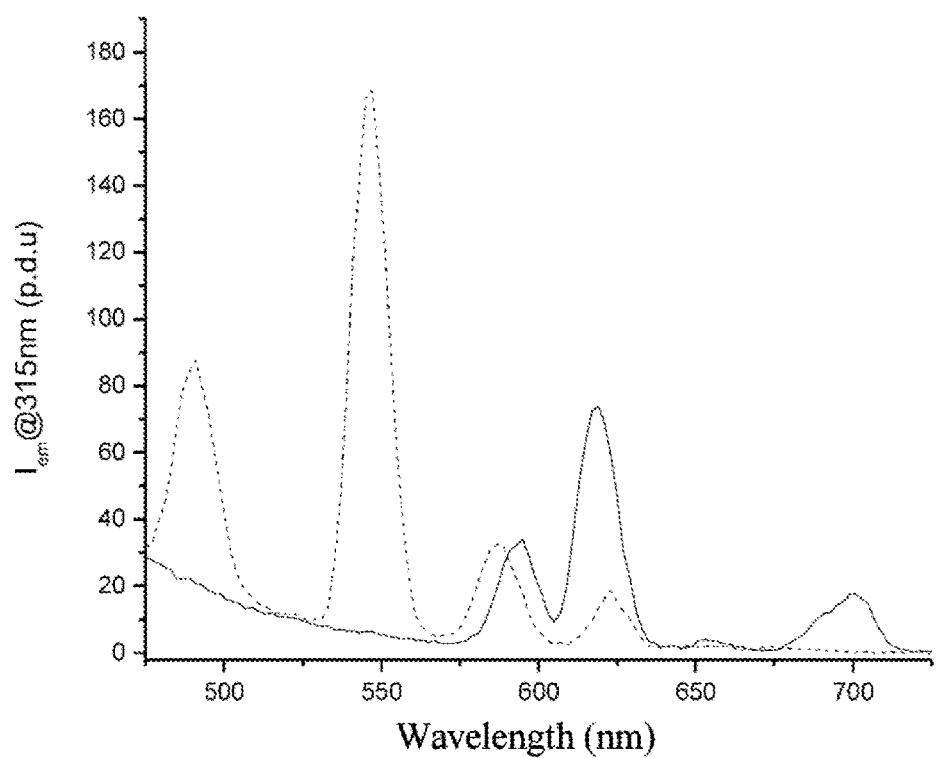
FIG. 15A shows the time-resolved emission spectrum (delay 0.1 ms, acquisition time 5 ms, time for complete decrease 10 ms, accumulation of 0.1 s per point) under excitation at 315 nm of the terbium and europium salts at 100 ppb in lead-free 95 prepared according to examples 30 and 31 with the europium salt as a solid line and the terbium salt as a broken line.
FIG. 15B and FIG. 15C show the time-resolved emission spectra (delay 0.1 ms, acquisition time 5 ms, time for complete decrease 10 ms, accumulation of 0.1 s per point) under excitation at 315 nm of the mixtures of salts in lead-free 95 prepared according to example 34 with, for 15B, a concentration of terbium salt and europium salt in lead-free 95 of 50 ppb, and for 15C a concentration of terbium salt of 75 ppb and a concentration of europium salt of 25 ppb.
Figure 15:
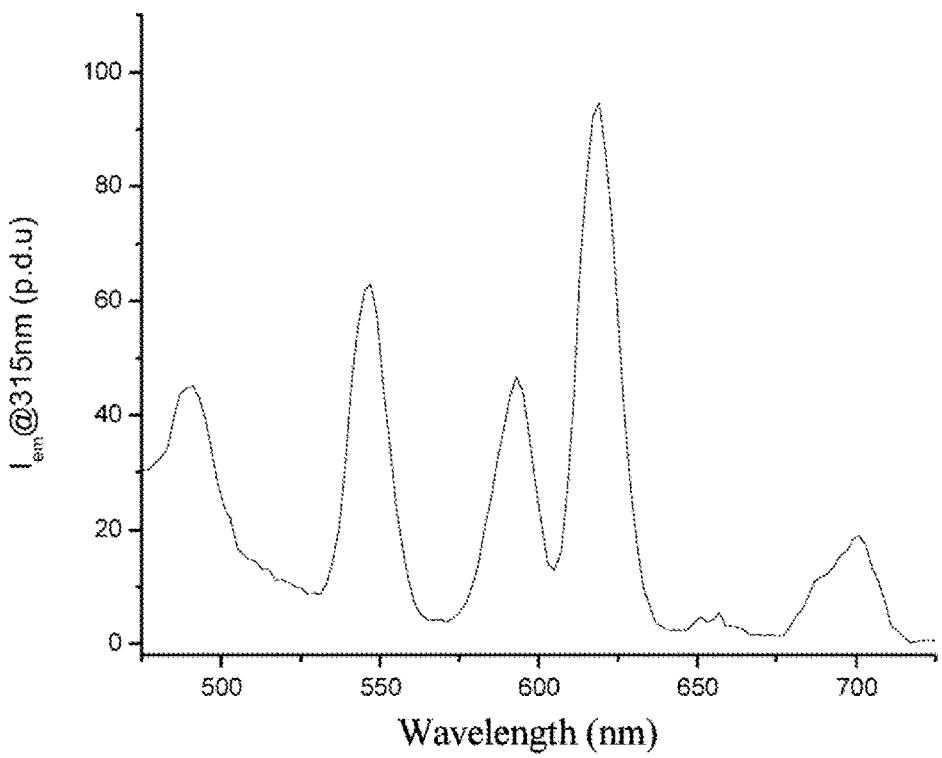
Figure 15:
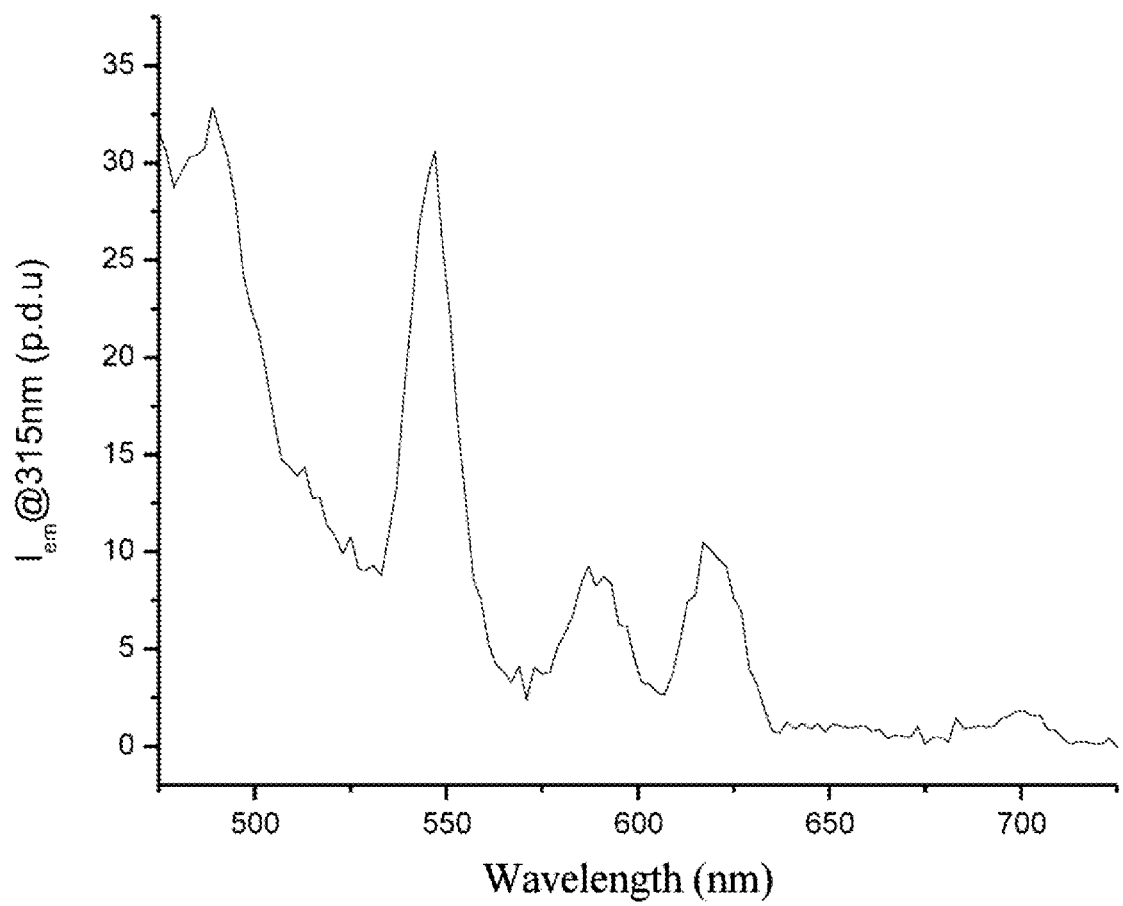

FIGS. 15A, 15B and 15C show the time-resolved emission spectra of the complexes of europium and of terbium after adding a developing solution to lead-free gasoline 95 comprising a combination of rare earth salts. These data show that it is possible to use several markers concurrently.

The invention claimed is:

1. A method for marking petroleum products, crude oils, biofuels or lubricants in order to make them traceable, consisting essentially of adding, to a petroleum product, crude oil, biofuel or lubricant: (i) a rare earth complex or (ii) a ligand capable of forming a rare earth complex, after adding a developing solution comprising a rare earth salt, or (iii) a rare earth salt capable of forming a rare earth complex, after adding a developing solution comprising a ligand.

2. The method as claimed in claim 1, wherein the rare earth is a lanthanide.

3. The method as claimed in claim 1, wherein the rare earth complex comprises at least one multidentate ligand comprising at least three coordination sites.

4. The method as claimed in claim 3, wherein the multidentate ligand comprises a heterocycle and in that at least three coordination sites of the multidentate ligand form, with other atoms, the heterocycle.

5. The method as claimed in claim 1, wherein the rare earth complex comprises a ligand selected from molecules of the polyamine and/or polycarboxylic acid type.

6. The method as claimed in claim 1, wherein the rare earth complex is detectable by time-resolved fluorescence.

7. The method as claimed in claim 1, wherein the ligand comprises (i) at least one aromatic ring containing at least one nitrogen atom or sulfur atom or (ii) conjugated aromatic rings, to produce an antenna effect.

8. The method as claimed in claim 1, wherein the petroleum product is gasoline, fuel oil, kerosene or gas oil.

9. A method for detecting a rare earth complex as a marker of petroleum products, crude oils, biofuels or lubricants, comprising time-resolved fluorescence detection of the rare earth complex in a sample of petroleum product, crude oil, biofuel or lubricant.

10. The method as claimed in claim 9, comprising the following steps:
   a) Preparing a sample of petroleum product, crude oil, biofuel or lubricant comprising a ligand, the ligand being capable of forming a rare earth complex detectable by time-resolved fluorescence, after adding a developing solution comprising a rare earth salt;
   b) Forming the rare earth complex by adding a developing solution comprising a rare earth salt; and
   c) Detecting the rare earth complex by time-resolved fluorescence.

11. The method as claimed in claim 9, comprising the following steps:
   a) Preparing a sample of petroleum product, crude oil, biofuel or lubricant comprising a rare earth salt, the rare earth salt being capable of forming a rare earth complex detectable by time-resolved fluorescence, after adding a developing solution comprising a ligand;
   b) Forming the rare earth complex by adding a developing solution comprising a ligand; and
   c) Detecting the rare earth complex by time-resolved fluorescence.

12. The method as claimed in claim 9, comprising the following steps:
   a) Mixing a sample of petroleum product, crude oil, biofuel or lubricant comprising, as marker, a rare earth complex detectable by time-resolved fluorescence, with an immiscible solution; and
   b) Detecting the rare earth complex by time-resolved fluorescence of the immiscible solution.

13. The method as claimed in claim 9, comprising the following steps:
   a) Impregnating a solid support with the petroleum product, crude oil, biofuel or lubricant comprising a rare earth complex as a marker; and
   b) Detecting the rare earth complex by time-resolved fluorescence performed on the solid support.

* * * * *